US011029897B2

(12) United States Patent
Shibata

(10) Patent No.: US 11,029,897 B2
(45) Date of Patent: Jun. 8, 2021

(54) COMMUNICATION DEVICE, NON-TRANSITORY COMPUTER-READABLE MEDIUM STORING COMPUTER-READABLE INSTRUCTIONS FOR COMMUNICATION DEVICE AND METHOD EXECUTED BY COMMUNICATION DEVICE

(71) Applicant: Brother Kogyo Kabushiki Kaisha, Nagoya (JP)

(72) Inventor: Hiroshi Shibata, Yatomi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 41 days.

(21) Appl. No.: 16/419,389

(22) Filed: May 22, 2019

(65) Prior Publication Data

US 2019/0361642 A1 Nov. 28, 2019

(30) Foreign Application Priority Data

May 22, 2018 (JP) .............................. JP2018-097688

(51) Int. Cl.
*G06F 3/12* (2006.01)
*H04L 9/30* (2006.01)
(Continued)

(52) U.S. Cl.
CPC .......... *G06F 3/1222* (2013.01); *G06F 3/1238* (2013.01); *G06F 3/1292* (2013.01);
(Continued)

(58) Field of Classification Search
None
See application file for complete search history.

(56) References Cited

U.S. PATENT DOCUMENTS 6,449,717 B1* 9/2002 Saito ....................... G06F 21/10
348/E7.056
2005/0163549 A1* 7/2005 Shima ................... G06F 21/608
400/62

(Continued)

FOREIGN PATENT DOCUMENTS

JP 2017-130727 A 7/2017

OTHER PUBLICATIONS

Wi-Fi Alliance, "DRAFT Device Provisioning Protocol Technical Specification", Version 0.2.11, pp. 1-133, 2017.

*Primary Examiner* — Mohammad H Ghayour
*Assistant Examiner* — Pawan Dhingra
(74) *Attorney, Agent, or Firm* — Banner & Witcoff, Ltd.

(57) ABSTRACT

A communication device may: comprise an output unit configured to output first information obtained by using a first public key in a memory in a case where a predetermined instruction is inputted to the communication device; after the first information has been outputted, receive an authentication request in which the first public key is used from a terminal device; send an authentication response to the terminal device; establish a wireless connection between the communication device and an external device; and in a case where a predetermined condition is satisfied after the first information has been outputted, create a second public key different from the first public key and store the second public key in the memory. In a case where the predetermined instruction is inputted to the communication device again, the output unit may be configured to output second information obtained by using the second public key in the memory.

22 Claims, 11 Drawing Sheets

(51) Int. Cl.
*H04L 9/08* (2006.01)
*H04W 12/06* (2021.01)
*G06F 21/60* (2013.01)
*H04L 9/14* (2006.01)
*H04W 12/0431* (2021.01)
*H04W 12/0433* (2021.01)

(52) U.S. Cl.
CPC .......... *G06F 21/608* (2013.01); *H04L 9/0894* (2013.01); *H04L 9/14* (2013.01); *H04L 9/30* (2013.01); *H04W 12/0431* (2021.01); *H04W 12/0433* (2021.01); *H04W 12/06* (2013.01)

(56) References Cited

U.S. PATENT DOCUMENTS

| | | | | |
|---|---|---|---|---|
| 2007/0195960 | A1* | 8/2007 | Goldman | H04L 9/30 380/286 |
| 2008/0288783 | A1* | 11/2008 | Jansen | G06F 21/57 713/189 |
| 2010/0293370 | A1* | 11/2010 | Xiao | H04W 12/0609 713/155 |
| 2011/0087872 | A1* | 4/2011 | Shah | G06F 21/554 713/2 |
| 2016/0277927 | A1* | 9/2016 | Lee | H04L 67/16 |
| 2017/0208465 | A1* | 7/2017 | Terao | H04L 63/062 |
| 2018/0109947 | A1* | 4/2018 | Kim | H04W 12/08 |

* cited by examiner (First Embodiment: First-time Bootstrapping)

(Authentication)

(Network Access)

(Second Embodiment: First-time Bootstrapping (Case with No Image Capture))

(Second Embodiment: First-time Bootstrapping (Case with Image Capture))

(Second Embodiment: Configuration (Case with Image Capture)) FIG. 10
(Case C1)
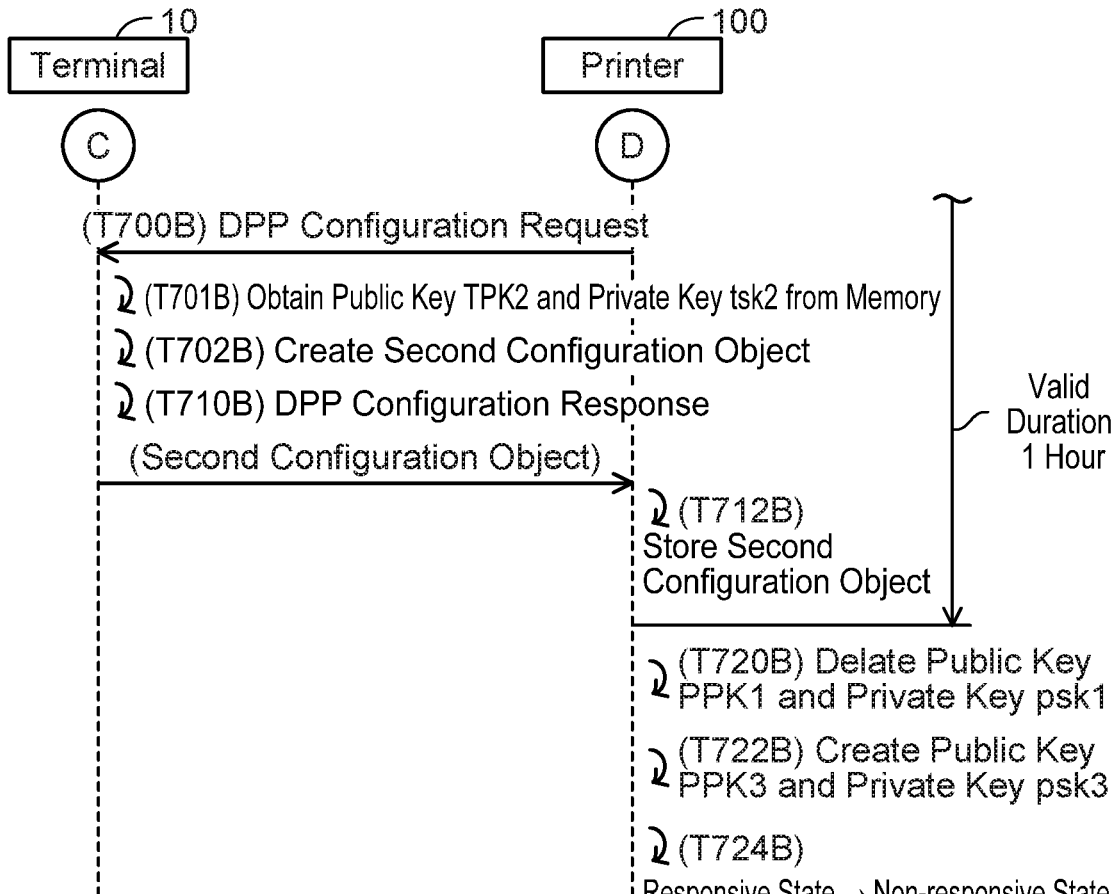
(Case C2)
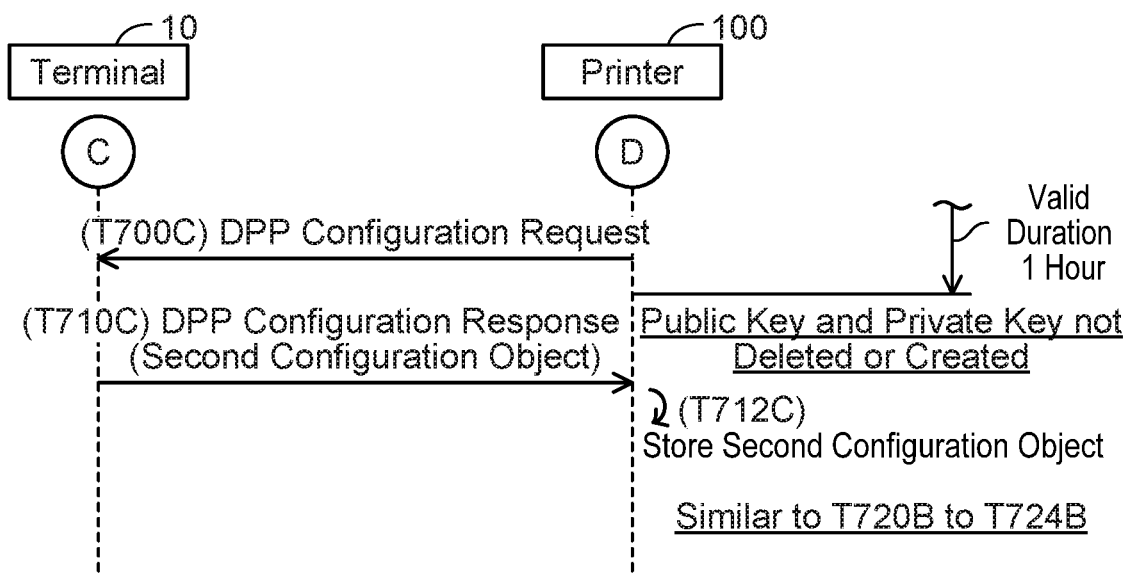

COMMUNICATION DEVICE, NON-TRANSITORY COMPUTER-READABLE MEDIUM STORING COMPUTER-READABLE INSTRUCTIONS FOR COMMUNICATION DEVICE AND METHOD EXECUTED BY COMMUNICATION DEVICE

CROSS-REFERENCE TO RELATED APPLICATION

This application claims priority to Japanese Patent Application No. 2018-097688 filed on May 22, 2018, the contents of which are hereby incorporated by reference into the present application.

TECHNICAL FIELD

The disclosure herein discloses a technique related to a communication device configured to establish a wireless connection with an external device.

DESCRIPTION OF RELATED ART

In a known technique, in a case of accepting an instruction to execute a communication parameter setting process from a user, a camera creates information to be used in an authentication process for the communication parameter setting process. Then, the camera creates code information from that information and displays the code information. A smartphone captures the code information of the camera to acquire the information and sends an authentication request to the camera by using the information, as a result of which the authentication process is executed by the camera. When the authentication process succeeds, data communication between the camera and the smartphone is enabled.

SUMMARY

In the above technique, the information to be used in the authentication process is created after the instruction to execute the communication parameter setting process has been accepted from the user, thus the user has to wait for the information to be created. Due to this, user convenience may be compromised. The disclosure herein provides a technique for improving user convenience.

A communication device disclosed herein may comprise: a first wireless interface; a processor; a memory storing computer-readable instructions therein and configured to store a first public key; and an output unit configured to output first information obtained by using the first public key in the memory in a case where a predetermined instruction is inputted to the communication device after the first public key has been stored in the memory. The computer-readable instructions, when executed by the processor, may cause the communication device to: after the first information has been outputted, receive, via the first wireless interface, an authentication request in which the first public key is used from a terminal device that obtained the first public key; in a case where the authentication request is received from the terminal device, send an authentication response, as a response for the authentication request, to the terminal device via the first wireless interface; after the authentication response has been sent to the terminal device, receive connection information from the terminal device via the first wireless interface, the connection information being for establishing a wireless connection via the first wireless interface between the communication device and an external device; in a case where the connection information is received from the terminal device, establish the wireless connection via the first wireless interface between the communication device and the external device by using the connection information; and in a case where a predetermined condition is satisfied after the first information has been outputted, create a second public key different from the first public key and store the second public key in the memory, wherein in a case where the predetermined instruction is inputted again to the communication device after the second public key has been stored in the memory, the output unit is further configured to output second information obtained by using the second public key in the memory.

A computer program for implementing the above communication device and a non-transitory computer-readable medium storing the computer program for the communication device are also novel and useful. Moreover, a method carried out by the communication device is also novel and useful.

BRIEF DESCRIPTION OF THE DRAWINGS

FIG. 10 shows a sequence diagram of a Configuration process in the case where the QR code is captured in the second embodiment.

EMBODIMENTS (Communication System; FIG. 1)
As shown in FIG. 1, a communication system 2 is provided with a plurality of Access Points (APs) 6, 8, a plurality of terminals 10, 50, 70, and a printer 100. In this embodiment, a situation is assumed in which a user is to establish a wireless connection according to a Wi-Fi scheme (hereinbelow termed "Wi-Fi connection") between the printer 100 and an AP (such as the AP 6) by using a terminal (such as the terminal 10).

Figure 1:
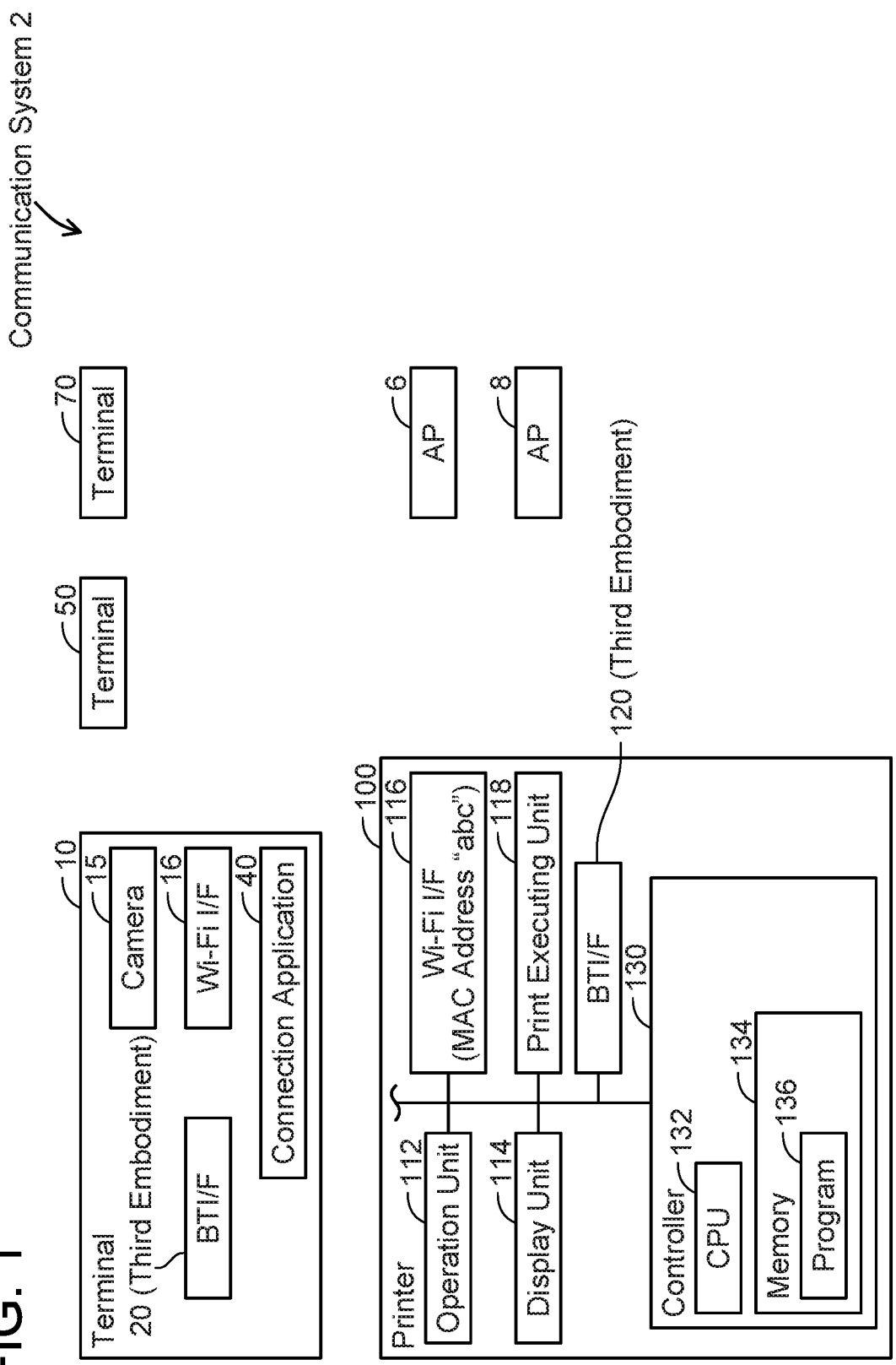
FIG. 1 shows a configuration of a communication system.

(Configuration of Terminal 10)
The terminal 10 is a portable terminal device such as a cellphone (e.g., a smartphone), a PDA, and a tablet PC. In a variant, the terminal 10 may be a desktop PC, a laptop PC or the like. The terminal 10 is provided with a camera 15 and a Wi-Fi interface 16. Hereinbelow, an interface will be simply termed "I/F". The camera 15 is a device configured to capture an image of an object, and in this embodiment, it is specifically used to capture QR codes (registered trademark) for an AP (such as the AP 6) and the printer 100. Further, the terminal 10 stores a connection application 40 (hereinbelow simply termed "app 40"). The app 40 is a program for establishing a Wi-Fi connection between the printer 100 and the AP, and is installed to the terminal 10, for example, from a server on the Internet provided by a vendor of the printer 100. Other terminals 50, 70 include the same configuration as that of the terminal 10.

The Wi-Fi I/F 16 is a wireless interface configured to execute Wi-Fi communication according to the Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, 11ac, etc.). The Wi-Fi I/F 16 especially supports Device Provisioning Protocol (DPP) scheme that is to be established by the Wi-Fi Alliance. The DPP scheme is described in the standard draft "DRAFT Device Provisioning Protocol Technical Specification Version 0.2.11" created by the Wi-Fi Alliance, and is a wireless communication scheme for easily establishing a Wi-Fi connection between a pair of devices (such as the printer 100 and the AP 6) by using a terminal (such as the terminal 10).

(Configuration of Printer 100)

The printer 100 is a peripheral (for example, a peripheral of the terminal device 10) capable of executing a print function. The printer 100 is provided with an operation unit 112, a display unit 114, a Wi-Fi I/F 116, a print executing unit 118, and a controller 130. The respective units 112 to 130 are connected to a bus line (reference sign not given).

The operation unit 112 is provided with a plurality of keys. The user can input various instructions to the printer 100 by operating the operation unit 112. The display unit 114 is a display configured to display various types of information. The Wi-Fi I/F 116 is same as the Wi-Fi I/F 16 of the terminal 10. That is, the Wi-Fi I/F 116 supports the DPP scheme. Further, the Wi-Fi I/F 116 has a MAC address "abc". The print executing unit 118 includes a print mechanism of an inkjet scheme or a laser scheme.

The controller 130 includes a CPU 132 and a memory 134. The CPU 132 is configured to execute various processes according to a program 136 stored in the memory 134. The memory 134 is constituted of a volatile memory, a nonvolatile memory and the like.

Figure 2:
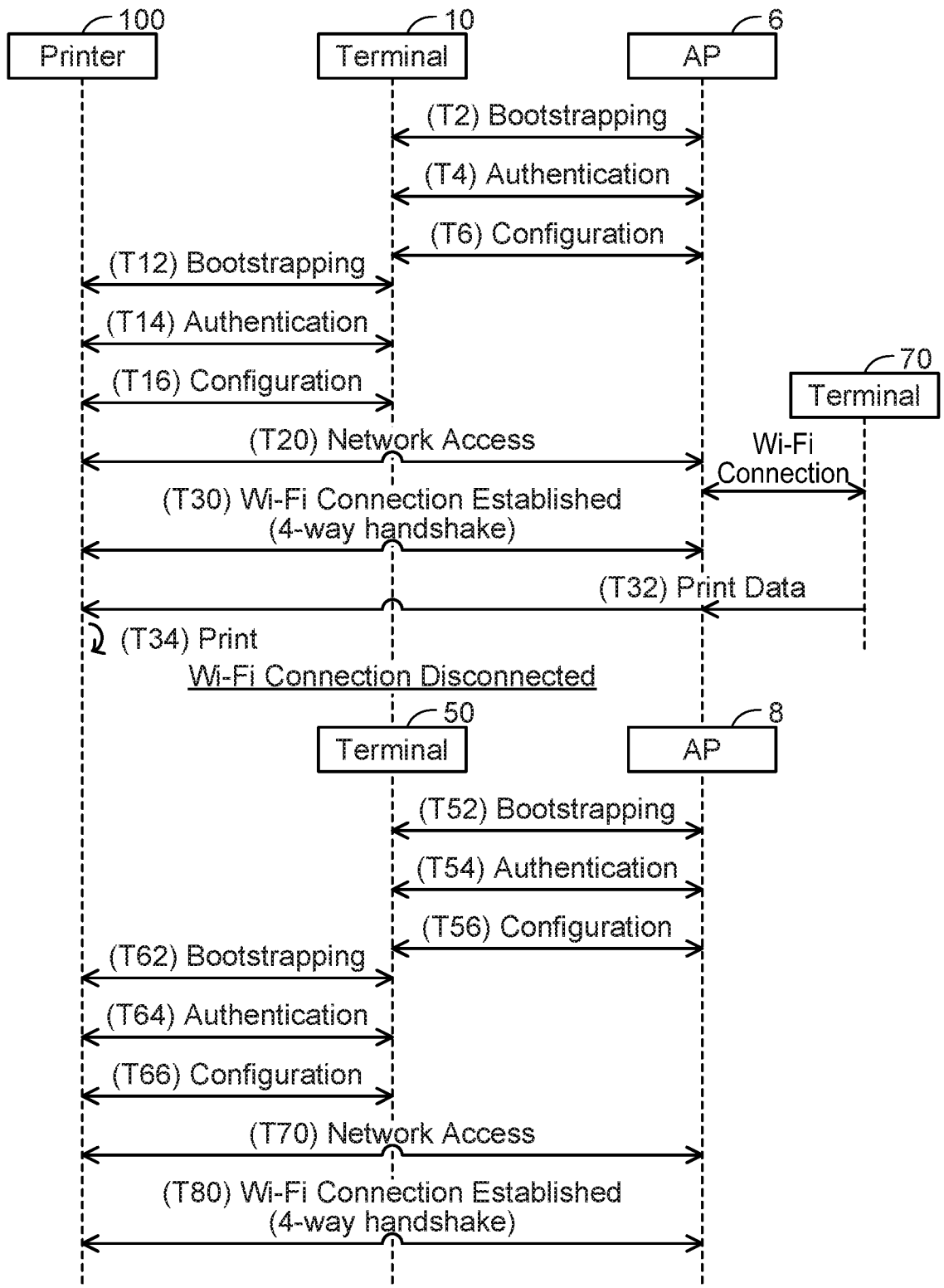
FIG. 2 shows an explanatory diagram for explaining an overview of an embodiment.

(Overview of Embodiment; FIG. 2)

Next, an overview of the embodiment will be described with reference to FIG. 2. As described above, the terminal 10 and the printer 100 support the DPP scheme, and further the AP 6 also supports the DPP scheme. In this embodiment, firstly a Wi-Fi connection between the printer 100 and the AP 6 is established by the AP 6, the terminal 10, and the printer 100 executing communication according to the DPP scheme. Further, in this embodiment, a Wi-Fi connection between the printer 100 and the AP 8 is established by the AP 8, the terminal 50, and the printer 100 executing communication according to the DPP scheme after the Wi-Fi connection established between the printer 100 and the AP 6 has been disconnected. Hereinbelow, to facilitate understanding, operations which CPUs of the respective devices (such as the CPU 132) execute will be described with the devices (such as the printer 100) as subjects of action instead of describing them with the CPUs as the subjects of action.

In T2, the terminal 10 executes Bootstrapping (hereinbelow simply termed "BS") according to the DPP scheme with the AP 6. The BS is a process of providing, from the AP 6 to the terminal 10, information that is used in Authentication (hereinbelow simply termed "Auth") of T4 to be described later in response to a QR code adhered to the AP 6 being captured by the terminal 10.

In T4, the terminal 10 executes the Auth according to the DPP scheme with the AP 6 by using the information obtained in the BS of T2. This Auth is a process for the terminal 10 and the AP 6 to authenticate their communication counterparts.

In T6, the terminal 10 executes Configuration (hereinbelow simply termed "Config") according to the DPP scheme with the AP 6. This Config is a process of sending information for establishing the Wi-Fi connection between the printer 100 and the AP 6 to the AP 6. Specifically, in the Config, the terminal 10 creates a first Configuration Object (hereinbelow, Configuration Object is simply termed "CO") for establishing the Wi-Fi connection between the printer 100 and the AP 6 and sends the first CO to the AP 6. As a result, the first CO is stored in the AP 6.

Next, in T12, the terminal 10 executes BS according to the DPP scheme with the printer 100. This BS is a process of providing, from the printer 100 to the terminal 10, information that is to be used in Auth of T14 to be described later in response to a QR code displayed in the printer 100 being captured by the terminal 10.

In T14, the terminal 10 executes Auth according to the DPP scheme with the printer 100 by using the information obtained in the BS of T12. This Auth is a process for the terminal 10 and the printer 100 to authenticate their communication counterparts.

In T16, the terminal 10 executes Config according to the DPP scheme with the printer 100. This Config is a process of sending information for establishing the Wi-Fi connection between the printer 100 and the AP 6 to the printer 100. In this Config, the terminal 10 creates a second CO for establishing the Wi-Fi connection between the printer 100 and the AP 6 and sends the second CO to the printer 100. As a result, the second CO is stored in the printer 100.

In T20, the printer 100 and the AP 6 use the stored first and second COs to execute Network Access (hereinbelow simply termed "NA") according to the DPP scheme. The NA is a process for sharing, between the printer 100 and the AP 6, a connection key for establishing the Wi-Fi connection.

In T30, the printer 100 and the AP 6 execute 4way-handshake communication. In at least a part of the 4way-handshake communication, the printer 100 and the AP 6 communicate encryption information encrypted by the connection key shared in the NA in T20. In a case where decryption of the encryption information succeeds, the Wi-Fi connection is established between the printer 100 and the AP 6. Due to this, the printer 100 can participate in a wireless network formed by the AP 6 as a child station, as a result of which the printer 100 can execute communication, via the AP 6, with another device (such as the terminal 70) participating in the wireless network. In a variant, the printer 100 and the AP 6 may execute Simultaneous Authentication of Equals (SAE, also called "Dragonfly") communication instead of the 4way-handshake communication.

In this embodiment, a Wi-Fi connection is already established between the terminal 70 and the AP 6. Due to this, when the printer 100 participates in the wireless network formed by the AP 6, both the terminal 70 and the printer 100 come to participate in this wireless network. Due to this, in T32, the printer 100 can receive print data representing an image to be printed from the terminal 70 with intermediation of the AP 6. In this case, the printer 100 executes print according to the print data in T34.

In this embodiment, the user of the printer 100 wishes to realize a state in which a Wi-Fi connection is established between the printer 100 and the AP 8 instead of the state in which the Wi-Fi connection is established between the printer 100 and the AP 6. In this case, after the Wi-Fi connection between the printer 100 and the AP 6 has been disconnected, processes of T52 to T80 are executed, by which the Wi-Fi connection is established between the printer 100 and the AP 8.

Specifically, the terminal 50 executes BS according to the DPP scheme with the AP8 in T52, executes Auth according to the DPP scheme with the AP 8 in T54 by using information obtained in the BS in T52, and executes Config according to the DPP scheme with the AP 8 in T56. As a result, a third CO for establishing the Wi-Fi connection between the printer 100 and the AP 8 is stored in the AP 8.

Further, the terminal 50 executes BS according to the DPP scheme in T62 with the printer 100, executes Auth according to the DPP scheme in T64 with the printer 100 by using information obtained in the BS in T62, and executes Config according to the DPP scheme with the printer 100 in T66. As a result, a fourth CO for establishing the Wi-Fi connection between the printer 100 and the AP 8 is stored in the printer 100.

In T70, the printer 100 and the AP 8 execute NA according to the DPP scheme by using the stored third and fourth COs, then execute 4way-handshake communication in T80. As a result, the Wi-Fi connection is established between the printer 100 and the AP 8.

(Description on Respective Processes; FIGS. 3 to 7)

Next, details of the respective processes executed in T12 to T20 and T62 of FIG. 2 will be described with reference to FIGS. 3 to 7. The processes of T2 to T6 are similar to the processes of T12 to T16 except that the AP 6 is used instead of the printer 100, the processes of T52 to T56 are similar to the processes of T12 to T16 except that the AP 8 is used instead of the printer 100, and the processes of T64 and T66 are similar to the processes of T14 and T16 except that the terminal 50 is used instead of the terminal 10. Due to this, the detailed descriptions for those processes will be omitted.

Figure 3:
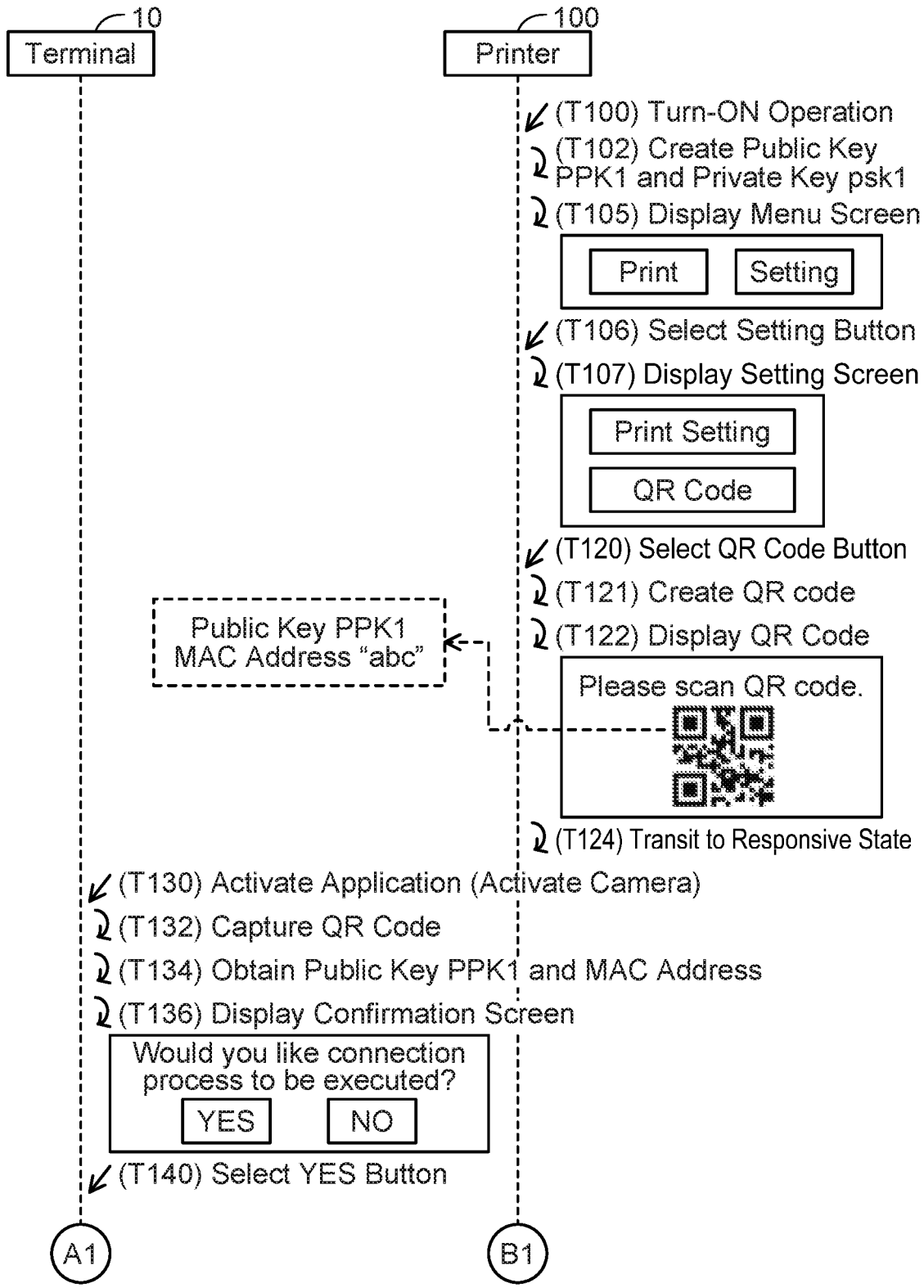
FIG. 3 shows a sequence diagram of a first-time Bootstrapping process.

(First-Time Bootstrapping (BS); FIG. 3)

Firstly, the first-time BS process executed by the printer 100 in T12 of FIG. 2 will be described with reference to FIG. 3. In an initial state of FIG. 3, power of the printer 100 has never been turned on since the printer 100 was shipped.

When accepting a turn-ON operation by the user in T100, the printer 100 creates a public key PPK1 and a private key psk1 in T102. Specifically, the printer 100 creates the public key PPK1 by using a pseudorandom number. Further, the printer 100 creates the private key psk1 that is paired with the public key PPK1 by using the created public key PPK1. Unless explicitly described otherwise, a public key and a private key are created according to the aforementioned method. Further, the printer 100 stores the public key PPK1 and the private key psk1 in the memory 134. Due to this, the public key PPK1 can be stored in the memory 134 in advance prior to selection of a QR code button to be described later (see T120). As a result, after the selection of the QR code button to be described later, a QR code which is obtained by coding the public key PPK1 can be displayed quickly.

In T105, the printer 100 causes the display unit 114 to display a menu screen. The menu screen is, in other words, a default screen of the printer 100 and includes a print button for causing the printer 100 to execute print and a setting button for designating various settings (such as print setting) of the printer 100.

When the setting button in the menu screen is selected by the user in T106, the printer 100 causes the display unit 114 to display a setting screen in T107. The setting screen includes a print setting button for changing print settings of the printer 100 and the QR code button for causing the printer 100 to display a QR code.

When accepting selection of the QR code button in the setting screen in T120, the printer 100 creates a QR code by coding the public key PPK1 in the memory 134 and the MAC address "abc" in T121. In other words, the QR code is a code image obtained by using the public key PPK1 and the MAC address "abc". In T122, the printer 100 causes the display unit 114 to display the created QR code.

For example, a comparative example may be assumed in which the QR code is created and stored in the memory 134 after the public key PPK1 is created in T102 as above and before the QR code button is selected. In this case, an area for storing the QR code until the QR code button is selected is necessary in the memory 134. Contrary to this, in the present embodiment, the QR code is created after the selection of the QR code button, thus such an area does not need to be provided in the memory 134. In a variant, however, the configuration of the aforementioned comparative example may be employed.

Next, in T124, the printer 100 transits an operation state of the printer 100 from a non-responsive state to a responsive state. The non-responsive state is a state in which the Wi-Fi I/F 116 does not send a DPP Authentication Response (hereinbelow simply termed "ARes") (see T210 of FIG. 4 to be described later) even when receiving a DPP Authentication Request (hereinbelow simply termed "AReq") (see T200 to be described later) from the terminal 10. The responsive state is a state in which the Wi-Fi I/F 116 sends the ARes to the terminal 10 in response to receiving the AReq from the terminal 10. That is, the printer 100 comes to be in a state of being able to execute the Auth (see T14 of FIG. 2) by transiting from the non-responsive state to the responsive state. Specifically, in this embodiment, the non-responsive state is a state in which even when receiving a signal from outside, the Wi-Fi I/F 116 does not supply the signal to the CPU 132. Further, the responsive state is a state in which in response to receiving a signal from outside, the Wi-Fi I/F 116 supplies the signal to the CPU 132 and sends a response to this signal. Since the responsive state is a state in which the CPU 132 processes a signal received from outside, its processing load is high compared to that of the non-responsive state. In a variant, the non-responsive state may be a state in which electricity is not supplied to the Wi-Fi I/F 116, and the responsive state may be a state in which the electricity is supplied to the Wi-Fi I/F 116. Further, in another variant, the non-responsive state may be a state in which even when receiving an AReq from outside, the Wi-Fi I/F 116 does not supply the CPU 132 with a notification that the AReq has been received, and the responsive state may be a state in which in response to receiving an AReq from outside, the Wi-Fi I/F 116 supplies the CPU 132 with a notification that the AReq has been received.

When accepting an activation operation for the app 40 from the user, the terminal 10 activates the app 40 and further activates the camera 15 in T130. Following processes to be executed by the terminal 10 are realized by the app 40. Next, in T132, the terminal 10 captures the QR code displayed on the printer 100 (see T122) by using the camera 15. Further, in T134, the terminal 10 decodes the captured QR code and obtains the public key PPK1 and the MAC address "abc".

In T136, the terminal 10 displays a confirmation screen inquiring the user whether or not to execute a connection process for establishing the Wi-Fi connection between the printer 100 and the AP 6. The confirmation screen includes a YES button indicating that the connection process is to be executed and a NO button indicating that the connection process is not to be executed. In T140, the terminal 10 accepts a selection of the YES button in the confirmation screen by the user. When the process of T140 is completed, the process of FIG. 3 is terminated.

Figure 4:
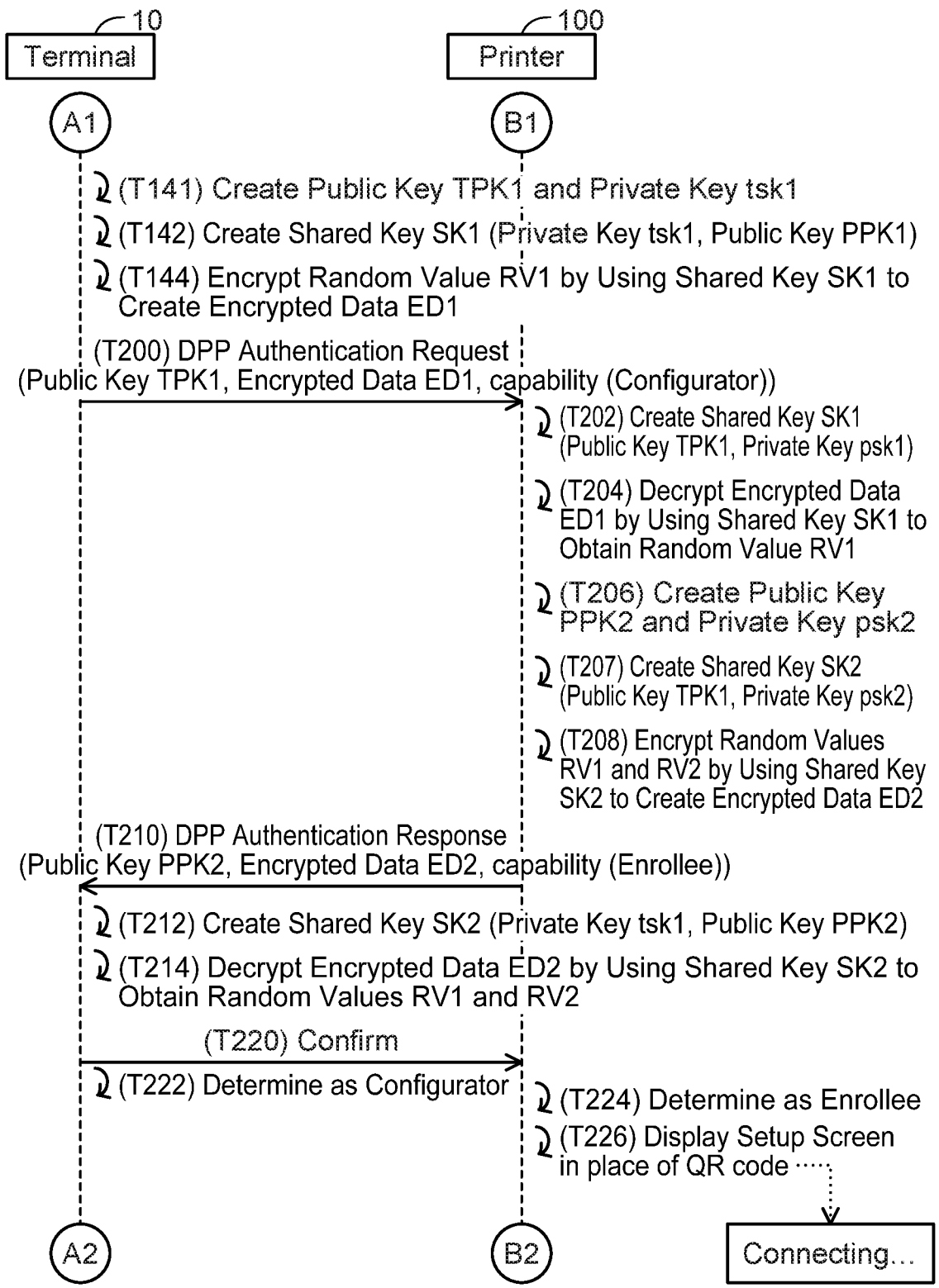
FIG. 4 shows a sequence diagram of an Authentication process.

(Authentication (Auth); FIG. 4)

Next, the process of the Auth in T14 of FIG. 2 will be described with reference to FIG. 4. When accepting the selection of the YES button in the confirmation screen in T140 of FIG. 3, the terminal 10 creates a public key TPK1 and a private key tsk1 of the terminal 10 in T141. Next, in T142, the terminal 10 creates a shared key SK1 according to Elliptic curve Diffie-Hellman key exchange (ECDH) by using the created private key tsk1 and the public key PPK1 of the printer 100 obtained in T134 of FIG. 3. Then, in T144, the terminal 10 encrypts a random value RV1 by using the created shared key SK1 to create encrypted data ED1.

In T200, the terminal 10 sends an AReq via the Wi-Fi I/F 16 to the printer 100 with the MAC address "abc" obtained in T134 of FIG. 3 as its destination. The AReq is a signal requesting the printer 100 to execute authentication. The AReq includes the public key TPK1 of the terminal 10 created in T141, the encrypted data ED1 created in T144, and a capability of the terminal 10.

A capability is information that is pre-designated in a device supporting the DPP scheme and includes a value which is one of: a value indicating that the device is capable of operating only as a Configurator according to the DPP scheme, a value indicating that the device is capable of operating only as an Enrollee according to the DPP scheme, and a value indicating that the device is capable of operating as both the Configurator and the Enrollee. The Configurator refers to a device configured to send a CO that is to be used in NA (T20 of FIG. 2) to the Enrollee in Config (T16 of FIG. 2). On the other hand, the Enrollee refers to a device that receives the CO that is to be used in the NA from the Configurator in the Config. As described above, in this embodiment, the terminal 10 creates the first and second COs and sends them respectively to the AP 6 and the printer 100. As such, the capability of the terminal 10 includes the value indicating that it is capable of operating only as the Configurator.

Next, the printer 100 executes following processes for authenticating a sender of the AReq (that is, the terminal 10). Specifically, in T202, the printer 100 firstly creates a shared key SK1 in accordance with the ECDH by using the public key TPK1 of the terminal 10 in the AReq and the private key psk1 of the printer 100 stored in advance in the memory 134. Here, the shared key SK1 created by the terminal 10 in T142 and the shared key SK1 created by the printer 100 in T202 are identical. Thus, the printer 100 can suitably decrypt, in T204, the encrypted data ED1 in the AReq by using the created shared key SK1, as a result of which the printer 100 can obtain the random value RV1. In a case where the decryption of the encrypted data ED1 succeeds, the printer 100 determines that the sender of the AReq is the device that had captured the QR code displayed on the printer 100, that is, determines that the authentication succeeded, and executes subsequent processes from T206. On the other hand, in a case where the decryption of the encrypted data ED1 does not succeed, the printer 100 determines that the sender of the AReq is not the device that had captured the QR code displayed on the printer 100, that is, determines that the authentication failed, and does not execute the subsequent processes from T206.

In T206, the printer 100 creates a new public key PPK2 and a new private key psk2 of the printer 100. In a variant, the public key PPK2 and the private key psk2 may be created at a time of T102 and stored in the memory 134 in advance. Next, in T207, the printer 100 creates a shared key SK2 in accordance with the ECDH by using the public key TPK1 of the terminal 10 in the AReq of T200 and the created private key psk2 of the printer 100. Then, in T208, the printer 100 encrypts the obtained random value RV1 and a new random value RV2 by using the created shared key SK2 to create encrypted data ED2.

In T210, the printer 100 sends an ARes to the terminal 10 via the Wi-Fi I/F 116. This ARes includes the public key PPK2 of the printer 100 created in T206, the encrypted data ED2 created in T208, and a capability of the printer 100. This capability includes the value indicating that the printer 100 is capable of operating only as the Enrollee.

In response to receiving the ARes from the printer 100 via the Wi-Fi I/F 16 in T210, the terminal 10 executes following processes for authenticating a sender of the ARes (that is, the printer 100). Specifically, in T212, the terminal 10 firstly creates a shared key SK2 in accordance with the ECDH by using the private key tsk1 of the terminal 10 created in T141 and the public key PPK2 of the printer 100 in the ARes. Here, the shared key SK2 created by the printer 100 in T207 and the shared key SK2 created by the terminal 10 in T212 are identical. Thus, the terminal 10 can suitably decrypt, in T214, the encrypted data ED2 in the ARes by using the created shared key SK2, as a result of which the terminal 10 can obtain the random values RV1 and RV2. In a case where the decryption of the encrypted data ED2 succeeds, the terminal 10 determines that the sender of the ARes is the printer that had displayed the captured QR code, that is, determines that the authentication succeeded, and executes subsequent processes from T220. On the other hand, in a case where the decryption of the encrypted data ED2 does not succeed, the terminal 10 determines that the sender of the ARes is not the printer that had displayed the captured QR code, that is, determines that the authentication failed, and does not execute the subsequent processes from T220.

In T220, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines in T222 to operate as the Configurator and the printer 100 determines in T224 to operate as the Enrollee.

When the printer 100 determines to operate as the Enrollee in T224, it causes the display unit 114 to display a Setup screen in T226 instead of the QR code that was displayed in T122 of FIG. 3. That is, the printer 100 stops displaying the QR code and starts displaying the Setup screen. The Setup screen is a screen that is displayed while the Config process (see FIG. 5) and the NA process (see FIG. 6) to be described later are executed, and indicates that these processes are being executed. Due to this, the user can acknowledge that the printer 100 is executing the processes for establishing the Wi-Fi connection. Further, by stopping the display of the QR code, it is possible to prevent the public key PPK1 from being acquired by another terminal. When the process of T226 is completed, the process of FIG. 4 is terminated.

Figure 5:
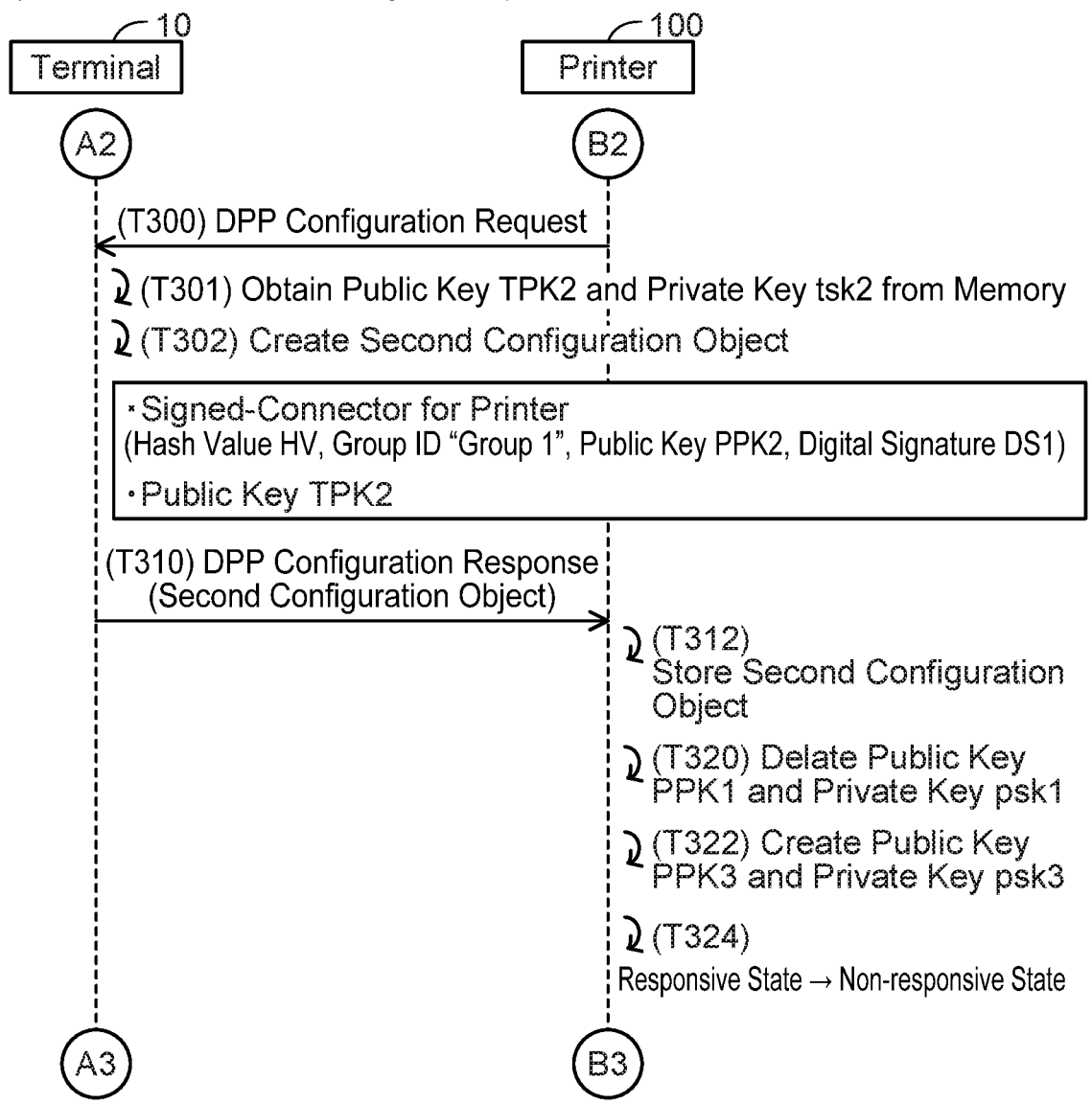
FIG. 5 shows a sequence diagram of a Configuration process.

(Configuration (Config); FIG. 5)

Next, the process of Config in T16 of FIG. 2 will be described with reference to FIG. 5. In T300, the printer 100 sends a DPP Configuration Request (hereinbelow simply termed "CReq") to the terminal 10 via the Wi-Fi I/F 116. This CReq is a signal requesting a CO (that is, the information for establishing the Wi-Fi connection between the printer 100 and the AP 6) to be sent.

When the terminal 10 receives the CReq from the printer 100 in T300 via the Wi-Fi I/F 16, it obtains a group ID "Group1", the public key TPK2, and the private key tsk2 from a memory (not shown) of the terminal 10 in T301. As described above, the terminal 10 had already executed the Config in T6 of FIG. 2 with the AP 6, and the group ID "Group1", the public key TPK2, and the private key tsk2 had been created and stored in the memory at that time. The group ID "Group1" is information for identifying the wireless network formed by the Wi-Fi connection between the printer 100 and the AP 6 being established. In a variant, a character string designated by the user may be used as the group ID. That is, in T301, the terminal 10 obtains the respective information stored in T6 of FIG. 2. Next, in T302, the terminal 10 creates the second CO (see T16 of FIG. 2). Specifically, the terminal 10 executes following processes.

The terminal 10 creates a hash value HV by hashing the public key TPK2 of the terminal 10. Further, the terminal 10 creates a specific value by hashing a combination of the hash value HV, the group ID "Group1", and the public key PPK2 of the printer 100 in the ARes in T210 of FIG. 4. Then, the terminal 10 encrypts the created specific value by using the private key tsk2 of the terminal 10 in accordance with an Elliptic Curve Digital Signature Algorithm (ECDSA) to create a digital signature DS1. As a result, the terminal 10 can create a Signed-Connector for printer (hereinbelow, the Signed-Connector is simply termed "SCont") including the hash value HV, the group ID "Group1", the public key PPK2 of the printer 100, and the digital signature DS1. Then, the terminal 10 creates the second CO including the SCont for printer and the public key TPK2 of the terminal 10.

In T310, the terminal 10 sends a DPP Configuration Response (hereinbelow simply termed "CRes") including the second CO to the printer 100 via the Wi-Fi I/F 16.

When the printer 100 receives the CRes from the terminal 10 in T310 via the Wi-Fi I/F 116, it stores the second CO in the CRes in the memory 134 in T312.

Further, in T320, the printer 100 deletes the public key PPK1 and the private key psk1 created in T102 of FIG. 3 from the memory 134. Then, in T322, the printer 100 creates a public key PPK3 that is different from the public key PPK1 and a private key psk3 that is different from the private key psk1 for use in a second-time Bootstrapping (see T62 of FIG. 2 and FIG. 7) to be described later. Specifically, the printer 100 creates a pseudorandom number by using information related to a communication traffic volume of the printer 100 (such as a total number of packets received via the Wi-Fi I/F 116, a total data size of information received via the Wi-Fi I/F 116 and the like) and creates the public key PPK3 by using this pseudorandom number. By using the above-described information related to the communication traffic volume and the MAC address "abc", a unique pseudorandom number can be created, as a result of which the public key PPK3 that has never been created can suitably be created. In a variant, the public key PPK3 may be created without using the information related to the communication traffic volume, or the public key PPK3 may be created by using another type of information related to the printer 100 (such as a number of printed sheets). Further, the printer 100 creates the private key psk3 that is paired with the public key PPK3 by using the created public key PPK3. Further, the printer 100 stores the public key PPK3 and the private key psk3 in the memory 134.

Further, in T324, the printer 100 transits the operation state of the printer 100 from the responsive state to the non-responsive state. Due to this, the responsive state can be suppressed from continuing over a long period of time in the printer 100. In other words, the state in which a signal which the Wi-Fi I/F 116 received from outside is supplied to the CPU 132, that is, the state in which the CPU 132 processes a signal received from outside, can be suppressed from continuing. Due to this, processing load of the printer 100 can be reduced. When the process of T324 is completed, the process of FIG. 5 is terminated.

Figure 6:
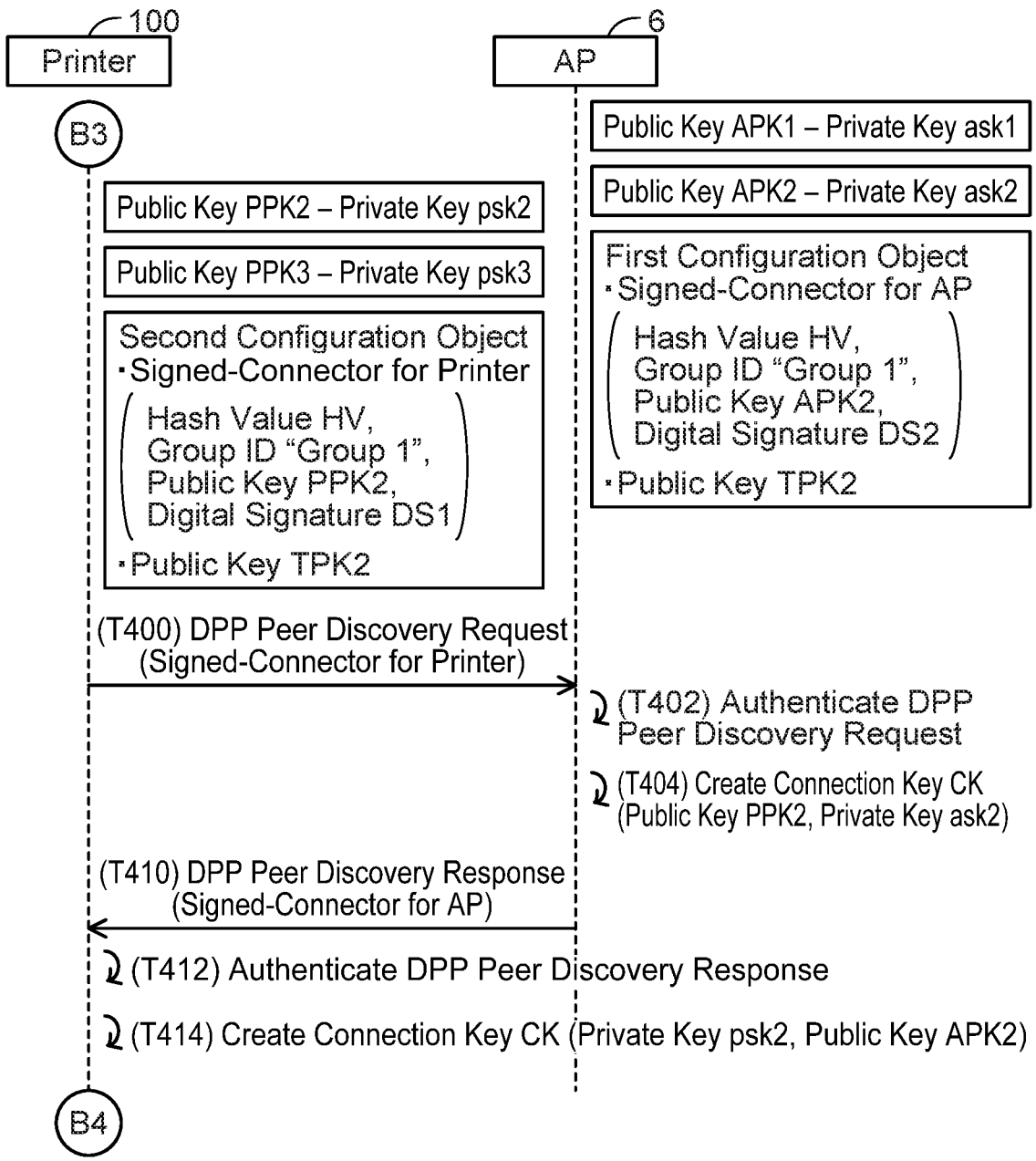
FIG. 6 shows a sequence diagram of a Network Access process.

(Network Access (NA); FIG. 6)

Next, the process of the NA in T20 of FIG. 2 executed between the printer 100 and the AP 6 will be described with reference to FIG. 6. As described above, the processes of T2 to T6 of FIG. 2 have already been executed between the terminal 10 and the AP 6. However, the AP 6 does not execute the processes of T102 to T124 of FIG. 3. The AP 6 stores a public key APK1 and a private key ask1 of the AP 6 in advance. Further, a QR code obtained by coding the public key APK1 of the AP 6 and a MAC address of the AP 6 is adhered to a housing of the AP 6. Processes similar to the processes from T134 of FIG. 3 are executed between the terminal 10 and the AP 6 when the terminal 10 captures the QR code. As a result, the AP 6 stores a public key APK2 and a private key ask2 of the AP 6 (see T206 of FIG. 4), and further stores the first CO received from the terminal 10 (see T310 of FIG. 5). The first CO includes a SCont for AP and the public key TPK2 of the terminal 10. This public key TPK2 is identical to the public key TPK2 included in the second CO. Further, the SCont for AP includes a hash value HV, a group ID "Group1", the public key APK2 of the AP 6, and a digital signature DS2. The hash value HV and the group ID "Group1" are respectively identical to the hash value HV and the group ID "Group1" included in the second CO. The digital signature DS2 is information obtained by encrypting a specific value, which is obtained by hashing a combination of the hash value HV, the group ID "Group1" and the public key APK2, by using the private key tsk2 of the terminal 10, and the digital signature DS2 is a value different from the digital signature DS1 included in the second CO.

In T400, the printer 100 sends a DPP Peer Discovery Request (hereinbelow simply termed "DReq") including the SCont for printer to the AP 6 via the Wi-Fi I/F 116. This DReq is a signal requesting the AP 6 to execute authentication and send the SCont for AP.

When receiving the DReq from the printer 100 in T400, the AP 6 executes a process of authenticating a sender of the DReq (that is, the printer 100) and the respective information in the DReq (that is, the hash value HV, the "Group1", and the public key PPK2). Specifically, in T402, the AP 6 firstly executes a first AP determination process regarding whether or not the hash value HV and the group ID "Group1" in the received SCont for printer respectively match the hash value HV and the group ID "Group1" in the SCont for AP included in the stored first CO. In the case of FIG. 6, the AP 6 determines "matching" in the first AP determination process, thus it determines that the authentication of the sender of the DReq (that is, the printer 100) succeeded. The fact that the hash value HV in the received SCont for printer matches the hash value HV in the SCont for AP included in the stored first CO means that the SCont for printer and the SCont for AP were created by the same device (that is, the terminal 10). As such, the AP 6 also determines that authentication of a creator of the received SCont for printer (that is, the terminal 10) succeeded. Further, the AP 6 decrypts the digital signature DS1 in the received SCont for printer by using the public key TPK2 of the terminal 10 included in the stored first CO. Since the decryption of the digital signature DS1 succeeds in the case of FIG. 6, the AP 6 executes a second AP determination process regarding whether or not a specific value obtained by decrypting the digital signature DS1 matches a value obtained by hashing the respective information in the received SCont for printer (that is, the hash value HV, the "Group1", and the public key PPK2). In the case of FIG. 6, the AP 6 determines "matching" in the second AP determination process, thus it determines that the authentication of the respective information in the DReq succeeded and executes processes from T404. The fact that "matching" is determined in the second AP determination process means that the respective information in the received SCont for printer (that is, the hash value HV, the "Group1", and the public key PPK2) has not been tampered by a third party after the second CO was stored in the printer 100. On the other hand, in a case where "not matching" is determined in the first AP determination process, in a case where the decryption of the digital signature DS1 fails, or in a case where "not matching" is determined in the second AP determination process, the AP 6 determines that the authentication failed and does not execute the processes from T404.

Next, in T404, the AP 6 creates a connection key (that is, a shared key) CK by using the obtained public key PPK2 of the printer 100 and the stored private key ask2 of the AP 6 in accordance with the ECDH.

In T410, the AP 6 sends a DPP Peer Discovery Response (hereinbelow simply termed "DRes") including the SCont for AP to the printer 100.

When receiving the DRes from the AP 6 in T410 via the Wi-Fi I/F 116, the printer 100 executes a process of authenticating a sender of the DRes (that is, the AP 6) and the respective information in the DRes (that is, the hash value HV, the "Group1", and the public key APK2). Specifically, in T412, the printer 100 firstly executes a first PR determination process regarding whether or not the hash value HV and the group ID "Group1" in the received SCont for AP respectively match the hash value HV and the group ID "Group1" in the SCont for printer included in the stored second CO. In the case of FIG. 6, the printer 100 determines "matching" in the first PR determination process, thus it determines that the authentication of the sender of the DRes (that is, the AP 6) succeeded. The fact that the hash value HV in the received SCont for AP matches the hash value HV in the SCont for printer included in the stored second CO means that the SCont for printer and the SCont for AP were created by the same device (that is, the terminal 10). As such, the printer 100 also determines that authentication of the creator of the received SCont for AP (that is, the terminal 10) succeeds. Further, the printer 100 decrypts the digital signature DS2 in the received SCont for AP by using the public key TPK2 of the terminal 10 included in the stored second CO. Since the decryption of the digital signature DS2 succeeds in the case of FIG. 6, the printer 100 executes a second PR determination process regarding whether or not a specific value obtained by decrypting the digital signature DS2 matches a value obtained by hashing the respective information in the received SCont for AP (that is, the hash value HV, the "Group1", and the public key APK2). In the case of FIG. 6, the printer 100 determines "matching" in the second PR determination process, thus it determines that the authentication of the respective information in the DRes succeeded and executes processes from T414. The fact that "matching" is determined in the second PR determination process means that the respective information in the received SCont for AP (that is, the hash value HV, the "Group1", and the public key APK2) has not been tampered by a third party after the first CO was stored in the AP 6. On the other hand, in a case where "not matching" is determined in the first PR determination process, in a case where the decryption of the digital signature DS2 fails, or in a case where "not matching" is determined in the second PR determination process, the printer 100 determines that the authentication failed and does not execute the processes from T414.

In T414, the printer 100 creates a connection key CK by using the stored private key psk2 of the printer 100 and the public key APK2 of the AP 6 in the received SCont for AP in accordance with the ECDH. Here, the connection key CK created by the AP 6 in T404 and the connection key CK created by the printer 100 in T414 are identical. Due to this, the connection key CK for establishing the Wi-Fi connection is shared between the printer 100 and the AP 6. When T414 is completed, the process of FIG. 6 is terminated.

As described above, after the connection key CK is shared between the printer 100 and the AP 6, the printer 100 and the AP 6 execute the 4way-handshake communication using the connection key CK in T30 of FIG. 2. As a result, the Wi-Fi connection is established between the printer 100 and the AP 6.

Figure 7:
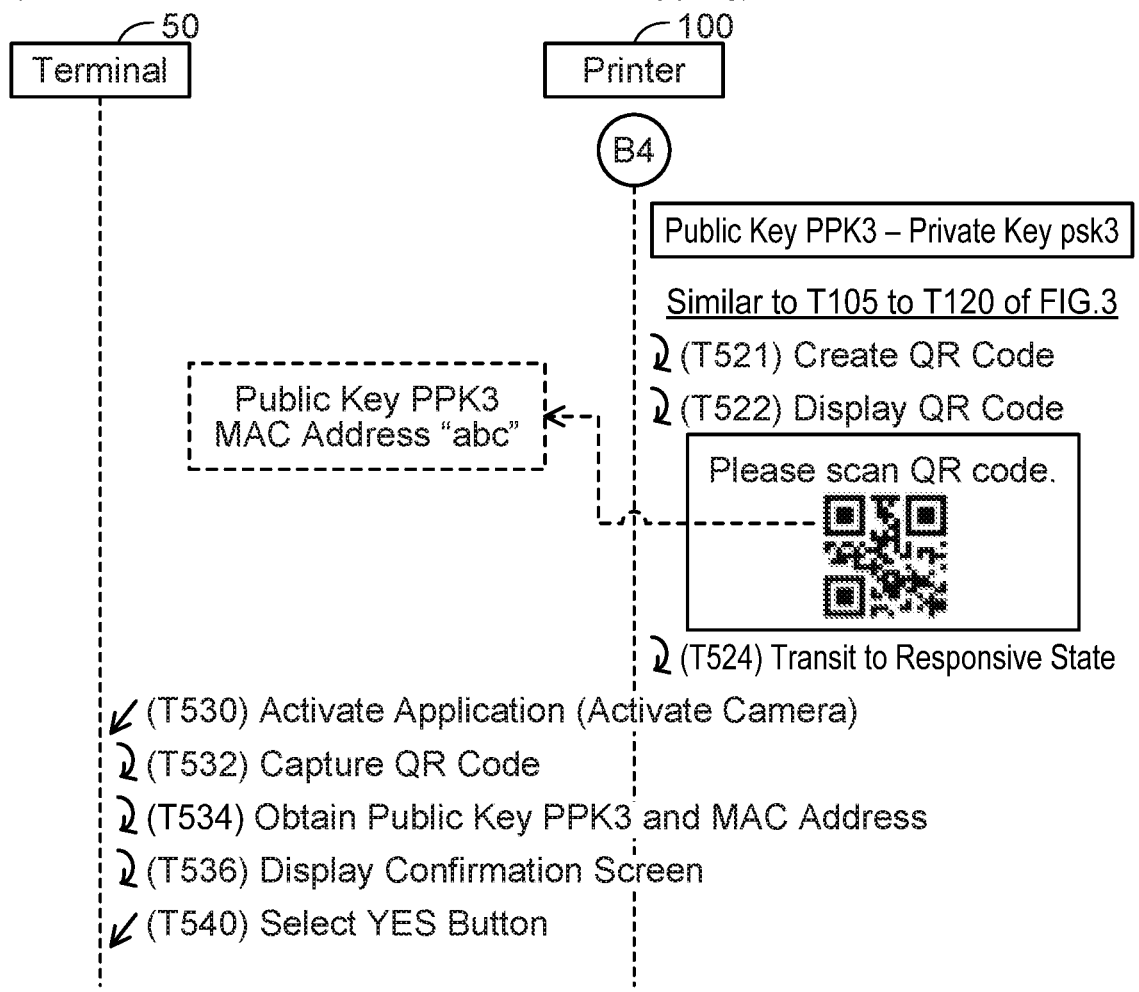
FIG. 7 shows a sequence diagram of a second-time Bootstrapping process.

(Second-Time Bootstrapping (BS); FIG. 7)

Next, the second-time BS process executed by the printer 100 in T62 of FIG. 2 will be described with reference to FIG. 7. In an initial state of FIG. 7, the Wi-Fi connection between the printer 100 and the AP 6 is disconnected, as shown in FIG. 2. Further, as a result of the process of T322 of FIG. 5, the public key PPK3 and the private key psk3 are stored in the memory 134 of the printer 100. Firstly, the printer 100 executes processes similar to T105 to T120 of FIG. 3. In the case where the QR code button in the setting screen is selected by the user (see T120 of FIG. 3), the printer 100 creates a QR code in T521 by coding the public key PPK3 in the memory 134 and the MAC address "abc". In T522, the printer 100 causes the display unit 114 to display the created QR code. T524 is similar to T124 of FIG. 3.

T530 and T532 are respectively similar to T130 and T132 of FIG. 3. In T534, the terminal 50 decodes the QR code captured in T532 and obtains the public key PPK3 and the MAC address "abc". T536 and T540 are respectively similar to T136 and T140 of FIG. 3. When T540 is completed, the BS process of FIG. 7 is terminated.

The processes of T64 to T80 are executed after the BS process of FIG. 7 (that is, T62 of FIG. 2) is executed. As a result, the Wi-Fi connection is established between the printer 100 and the AP 8.

Effects of Embodiment

If the printer 100 keeps using the same public key PPK1 and private key psk1, the public key PPK1 may be acquired by a third party who is not a legitimate user of the printer 100. In this case, the third party may connect the printer 100 to an AP of the third party, by which the third party may use the printer 100 without authorization. To avoid such situation, in the present embodiment, the printer 100 deletes the public key PPK1 and the private key psk1 when the BS and the Auth using the public key PPK1 and the private key psk1 are completed, and creates the new public key PPK3 and private key psk3. Due to this, unauthorized use of the printer 100 by the third party can be prevented.

Here, for example, a comparative example may be assumed in which the process of T322 of FIG. 5 is not executed and the public key PPK3 and the private key psk3 are created after the QR code button in the setting screen has been selected by the user in the BS of FIG. 7. In this case, the user needs to wait for the public key PPK3 and the private key psk3 to be created after having selected the QR code button in the setting screen. Contrary to this, in the present embodiment, the printer 100 creates the public key PPK3 and the private key psk3 and stores them in the memory 134 in the Config of FIG. 5. That is, the printer 100 creates the public key PPK3 and the private key psk3 and stores them in the memory 134 in advance (T322 of FIG. 5) prior to the QR code button in the setting screen being selected again by the user in the BS of FIG. 7. Due to this, when the QR code button is selected again by the user, the printer 100 can promptly cause the display unit 114 to display the QR code obtained by using the public key PPK3 in the memory 134 (T522 of FIG. 7). As a result, the Wi-Fi connection between the printer 100 and the AP 8 can promptly be established. According to the present embodiment, user convenience can be improved.

(Corresponding Relationships)

The printer 100, the terminal 10, and the AP 6 are respectively examples of "communication device", "terminal device", and "external device". The display unit 114 and the Wi-Fi I/F 116 are respectively examples of "output unit" and "first wireless interface". Selection of the QR code button in T120 of FIG. 3 is an example of "predetermined instruction". The public key PPK1 of FIG. 3 is an example of "first public key", and the QR code in T122 is an example of "first information (and first code image)". The AReq in T200 of FIG. 4 and the ARes in T210 are respectively examples of "authentication request" and "authentication response". The Setup screen in T226 of FIG. 4 is an example of "execution screen". The second CO in T302 of FIG. 5 is an example of "connection information". Receipt of the CRes from the terminal 10 in T310 of FIG. 5 is an example of "predetermined condition is satisfied". The public key PPK3 of FIG. 5 is an example of "second public key", and the QR code in T522 of FIG. 7 is an example of "second information (and second code image)".

The process of T200, the process of T210 of FIG. 4, the process of T310 of FIG. 5, the process of T30 of FIG. 2, and the process of T322 of FIG. 5 are respectively examples of "receive an authentication request", "send an authentication response", "receive connection information", "establish the wireless connection", and "create a second public key".

Second Embodiment

In the present embodiment, the printer 100 is configured to print a QR image including a QR code instead of displaying the QR code obtained by using the public key (T122 of FIG. 3).

Figure 8:
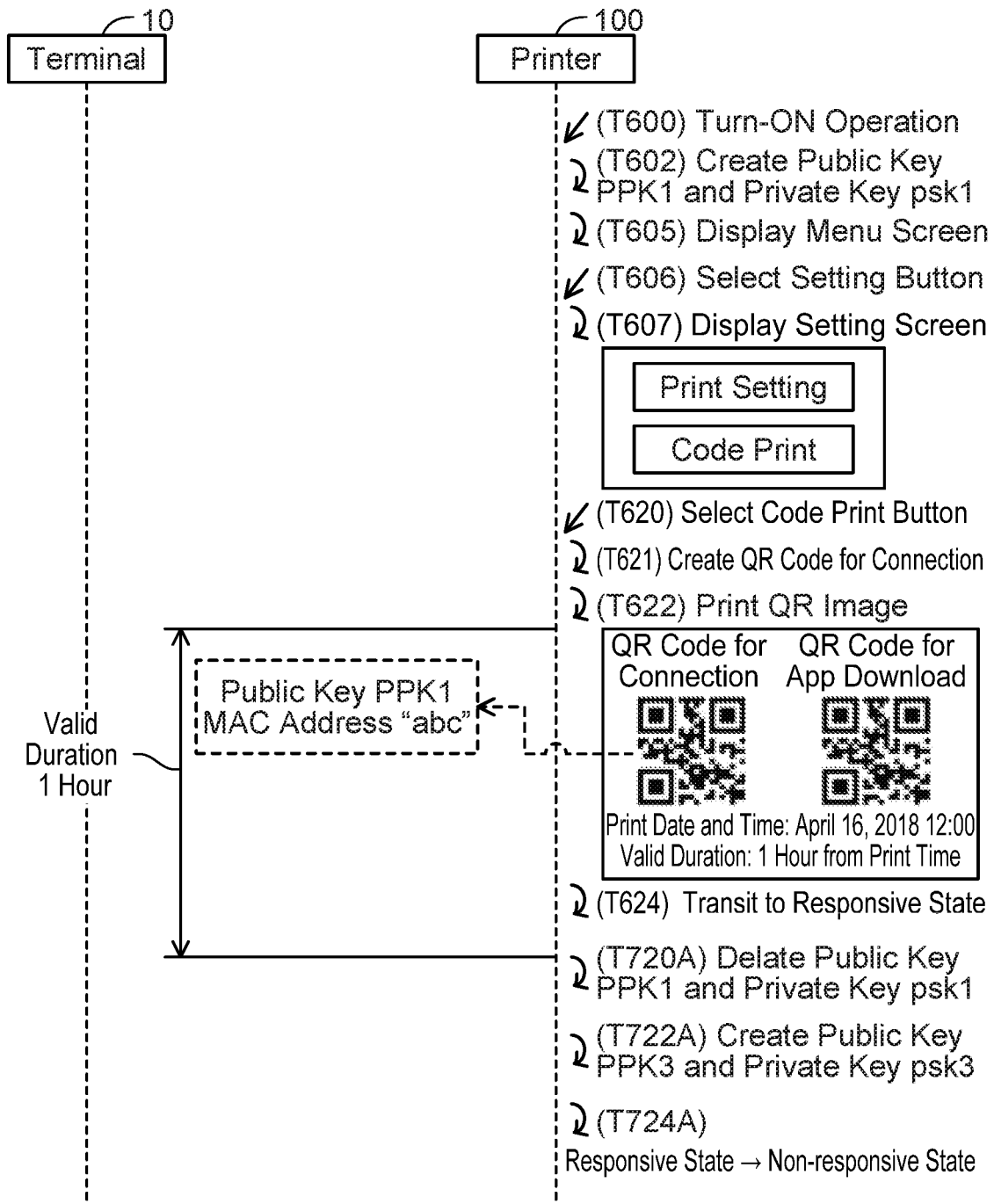
FIG. 8 shows a sequence diagram of a first-time Bootstrapping process in a case where a QR code is not captured in a second embodiment.
Figure 9:
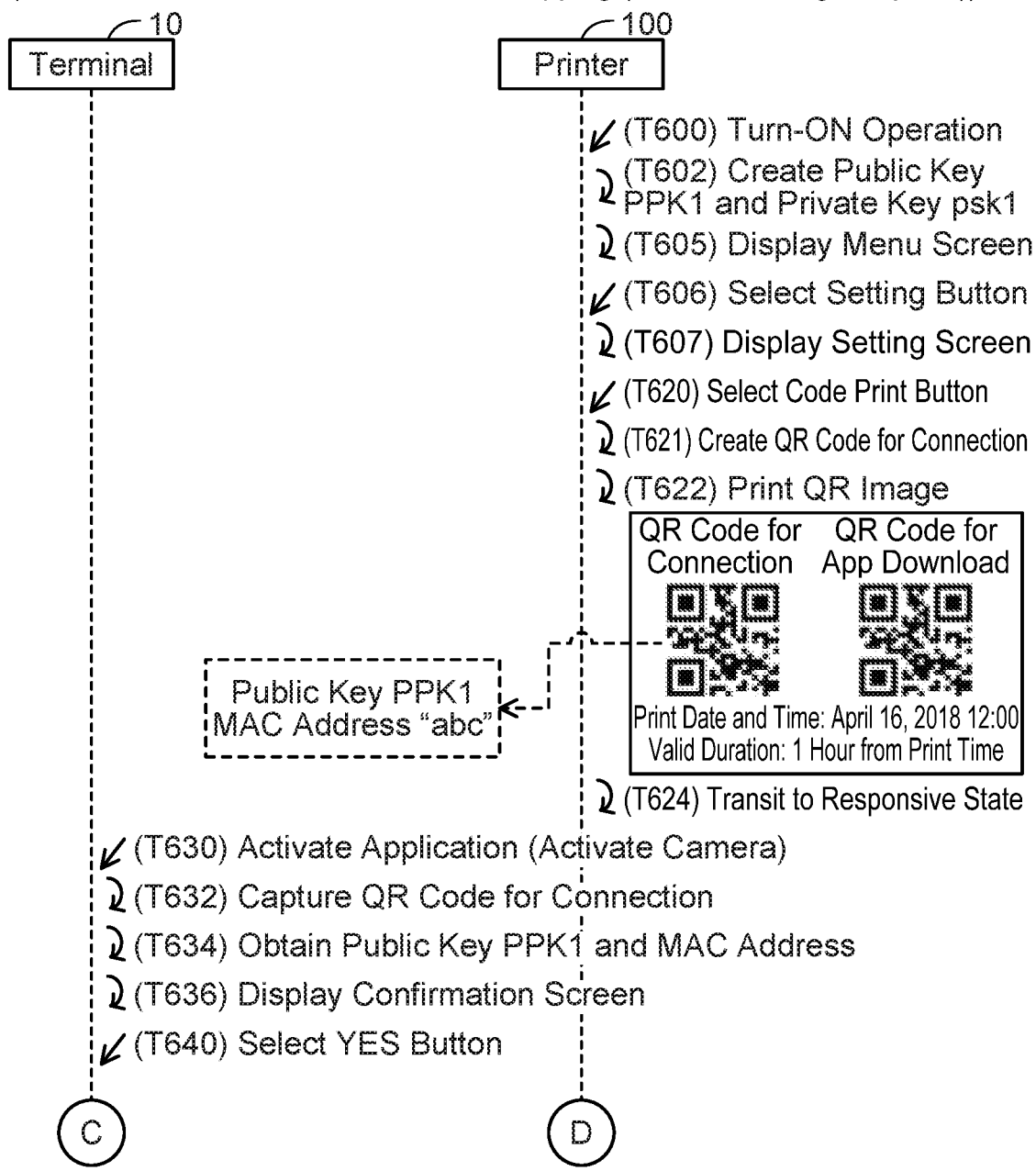
FIG. 9 shows a sequence diagram of the first-time Bootstrapping process in a case where the QR code is captured in the second embodiment.

(Description on Respective Processes; FIGS. 8 to 10)

Next, details of respective processes executed in T12 and T16 of FIG. 2 will be described with reference to FIGS. 8 to 10.

(BS in T12 of FIG. 2 (Case with No Image Capture); FIG. 8)

A case in which a QR code is not captured in the BS in T12 of FIG. 2 will be described with reference to FIG. 8.

T600 to T606 are similar to T100 to T106 of FIG. 3. A setting screen displayed in T607 includes a code print button for printing a QR image instead of the button for displaying the QR code.

When the printer 100 receives a selection of the code print button in the setting screen in T620, it then creates a QR code for connection in T621 by coding the public key PPK1 in the memory 134 and the MAC address "abc". Then, in T622, the printer 100 causes the print executing unit 118 to execute print of a QR image including the QR code for connection, a QR code for app download, print date and time, and a valid duration.

The QR code for app download is a code image obtained by coding a location of the app 40 on the Internet, that is, by coding a Uniform Resource Locator (URL) of a server that stores the app 40. For example, when the terminal 10 captures the QR code for app download in the QR image by using the camera 15, it decodes the captured QR code for app download and obtains the URL. Then, the terminal 10 uses the obtained URL to access the server and installs the app 40 from the server. As such, even in a situation where the app 40 has not been installed in the terminal 10, the user can install the app 40 in the terminal 10 to establish the Wi-Fi connection between the printer 100 and the AP 6.

The print date and time indicates date and time when the QR image was printed. The valid duration indicates a duration during which the public key PPK1 can be used. The valid duration may be, for example, a duration of one hour from the print date and time. If a printed matter including the QR code for connection is acquired by a third party, the public key PPK1 of the printer 100 is acquired by the third party. By setting the valid duration of the public key PPK1 as in the present embodiment, the acquisition of the public key PPK1 by the third party can be prevented.

T624 is similar to T124 of FIG. 3. In the present case, the valid duration elapses after the QR code has been printed without the QR code for connection being captured by the terminal 10. In this case, the printer 100 deletes the public key PPK1 and the private key psk1 from the memory 134 in T720A without executing the Auth process and the like. Then, in T722A, the printer 100 creates the public key PPK3 and the private key psk3 and stores them in the memory 134. T724A is similar to T324 of FIG. 5.

According to the present case, the public key PPK3 and the like are created upon when the valid duration elapses, and thus a QR image including a QR code for connection obtained by using the public key PPK3 can be promptly printed when the code print button in the setting screen is selected again. The user convenience can be improved.

(BS in T12 of FIG. 2 (Case with Image Capture); FIG. 9)

The first-time BS process in a case where the QR code in the printed QR image is captured will be described with reference to FIG. 9.

T600 to T624 are similar to FIG. 8. In the present case, the QR code for connection in the QR image is captured by the terminal 10 before the valid duration elapses. Specifically, T630 is similar to T130 of FIG. 3, and T632 is similar to T132 of FIG. 3 except that the QR code for connection in the QR image is captured. T634 to T640 are similar to T134 to T140 of FIG. 3. Due to this, the Auth process in T14 of FIG. 2 (see FIG. 4) is executed.

(Configuration; FIG. 10)

The Config process in T16 of FIG. 2 executed subsequent to the Auth process will be described with reference to FIG. 10.

In Case C1 of FIG. 10, the valid duration elapses after the Config process is completed. Specifically, T700B to T712B are similar to T300 to T312 of FIG. 5. When the process of T712B is completed, the Config process is thereby completed. Then, the printer 100 executes processes of T720B to T724B in a case where the valid duration elapses after the process of T712B is completed (that is, after the CRes including the second CO has been received from the terminal 10 and stored). T720B to T724B are similar to T720A to T724A of FIG. 8. After this, T20 and T30 of FIG. 2 are executed, and the Wi-Fi connection is thereby established between the printer 100 and the AP 6.

Similarly to the case of FIG. 8, in Case C1 as well, the public key PPK3 and the like are created upon when the valid duration elapses. Due to this, the QR image including the QR code for connection can be promptly printed when the code print button in the setting screen is selected again.

In Case C2 of FIG. 10, the valid duration elapses before completion of the Config process. Specifically, the valid duration elapses after the CReq has been sent to the terminal 10 in T700C and before the CRes is received from the terminal 10 in T710C. In this case, the printer 100 does not delete the public key PPK1 or create the public key PPK3. Then, when receiving the CRes from the terminal 10 in T710C, the printer 100 stores the second CO in the CRes in the memory 134 in T712C and executes processes similar to T720B to T724B. In a case where the valid duration elapses during the Auth process as well, the printer 100 does not delete the public key PPK1 or create the public key PPK3, and in the case of receiving the CRes from the terminal 10, the printer 100 deletes the public key PPK1 and creates the public key PPK3.

For example, if the public key PPK1 is deleted due to the valid duration elapsing during the Auth process and the Config process, it may become impossible to continue the Auth process and the Config process. In the present embodiment, the public key PPK1 is not deleted even when the valid duration elapses before the Config process is completed, and thus the Auth process and the Config process can suitably be executed. Further, since the printer 100 creates the public key PPK3 when it receives the CRes from the terminal 10 (T710C), the QR image including the QR code for connection can promptly be printed when the code print button in the setting screen is selected again.

(Corresponding Relationships)

Selection of the code print button in T620 of FIG. 8 is an example of "predetermined instruction". The valid duration and the connection application 40 are respectively examples of "predetermined time" and "application program". Elapse of the valid duration is an example of "predetermined condition is satisfied".

Third Embodiment

In this embodiment, the printer 100 sends a signal including the public key PPK1 by using Bluetooth (registered trademark) instead of displaying or printing the QR code obtained by using the public key.

In this embodiment, as shown in FIG. 1, the printer 100 is provided with a Bluetooth interface 120 (hereinbelow termed "BT I/F 120"). The BT I/F 120 is an I/F for executing wireless communication according to a Bluetooth scheme (hereinbelow termed "BT scheme"). The BT scheme is a wireless communication scheme according to IEEE 802.15.1 standard and standards complying thereto, for example. More specifically, the BT I/F 22 supports Bluetooth Low Energy (BLE). The BLE is a standard that is implemented in version 4.0 of the BT scheme and newer versions thereof. In the BLE, an Advertise signal to be described later can be used. Further, the terminal 10 is also provided with a BT I/F 20 similar to the BT I/F 120 of the printer 100.

Differences between the Wi-Fi scheme and the BT scheme will be described. A communication speed of Wi-Fi communication (a maximum communication speed of 600 Mbps, for example) is faster than a communication speed of BT communication (a maximum communication speed of 24 Mbps, for example). Further, a frequency of carrier waves used in Wi-Fi communication is 2.4 GHz band or 5.0 GHz band. A frequency of carrier waves used in BT communication is 2.4 GHz band. That is, in a case where the 5.0 GHz band is employed as the frequency of carrier waves used in Wi-Fi communication, the frequency of carrier waves used in Wi-Fi communication differs from the frequency of carrier waves used in BT communication. Further, a maximum distance with which Wi-Fi communication can be executed (about 250 m, for example) is greater than a maximum distance with which BT communication can be executed (about 100 m, for example).

Figure 11:
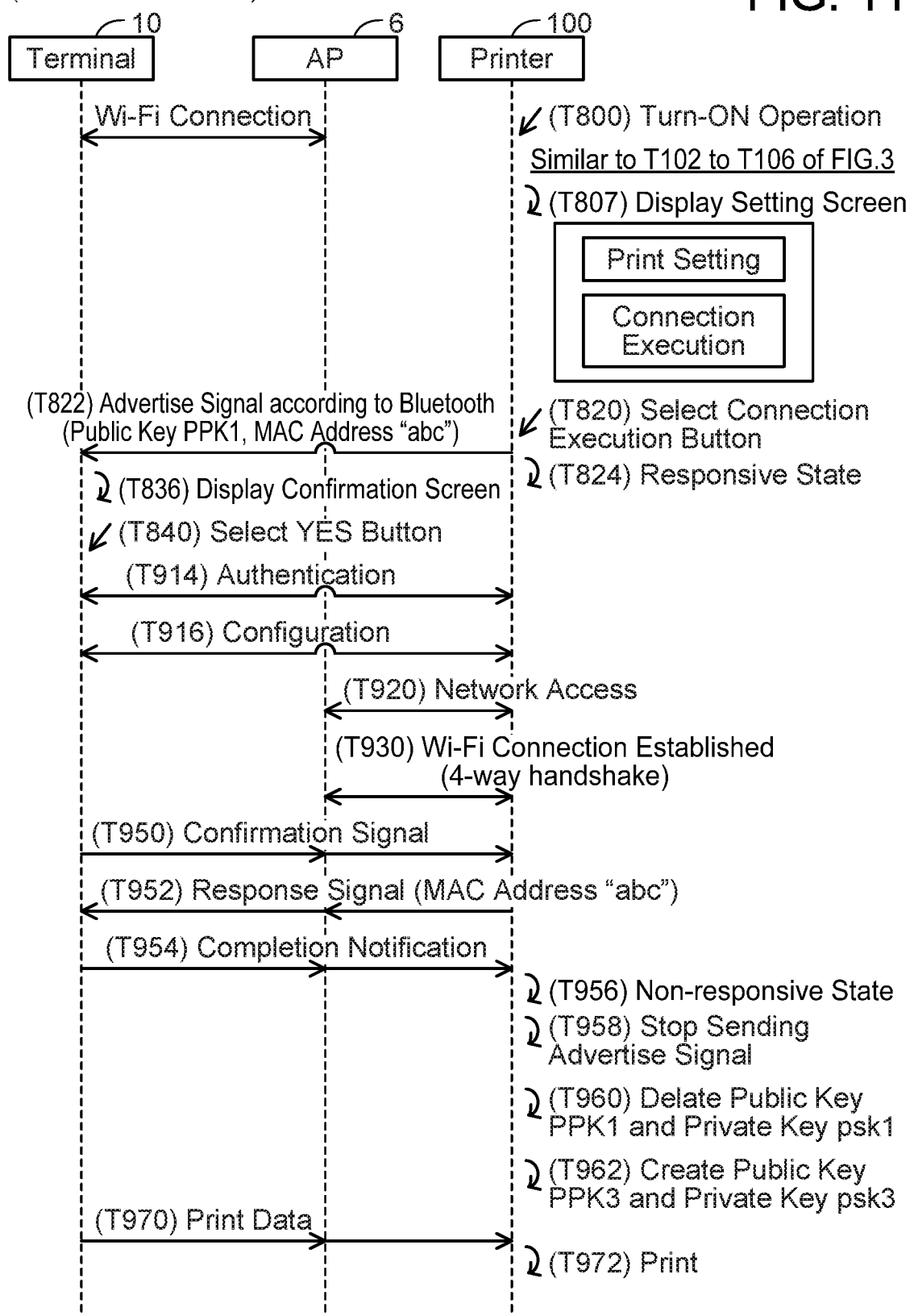
FIG. 11 shows an explanatory diagram for explaining a third embodiment.

(Process of Embodiment; FIG. 11)

Process of the present embodiment will be described with reference to FIG. 11. In an initial state of FIG. 11, the power of the printer 100 has never been turned on since the printer 100 was shipped. Further, a Wi-Fi connection is already established between the terminal 10 and the AP 6. Moreover, the processes of T2 to T6 of FIG. 2 have already been executed between the terminal 10 and the AP 6.

When accepting the turn-ON operation by the user in T800, the printer 100 executes processes similar to T102 to T106 of FIG. 3. A setting screen displayed in T807 includes a connection execution button for causing the printer 100 to execute a process for establishing a Wi-Fi connection with the AP 6 instead of the button for displaying or printing the QR code.

When accepting selection of the connection execution button in the setting screen in T820, the printer 100 broadcasts an Advertise signal including the public key PPK1 and the MAC address "abc" via the BT I/F 120 in T822. The Advertise signal is a signal for informing a presence of the printer to devices around the printer 100. T824 is similar to T124 of FIG. 3.

The terminal 10 receives the Advertise signal from the printer 100 via the BT I/F 20 in T822. Then, the terminal 10 obtains information in the Advertise signal (that is, the public key PPK1 and the MAC address "abc"). T836 and T840 are similar to T136 and T140 of FIG. 3, respectively. T914 to T930 are similar to T14 to T30 of FIG. 2. As a result, the Wi-Fi connection is established between the printer 100 and the AP 6.

Further, the terminal 10 determines in T950 and T952 whether or not the printer 100 has participated in the wireless network formed by the AP 6 as a child station. Specifically, the terminal 10 sends a confirmation signal for broadcast to the AP 6 via the Wi-Fi I/F 16 in T950. Due to this, the confirmation signal is sent to all child stations that have established Wi-Fi connection with the AP 6. As described above, the Wi-Fi connection is established between the printer 100 and the AP 6, and thus the printer 100 receives the confirmation signal from the AP 6 via the Wi-Fi I/F 116 in T950. In this case, the printer 100 sends a response signal for the confirmation signal to the AP 6 via the Wi-Fi I/F 116 in T952. This response signal includes the MAC address "abc".

The AP 6 receives the response signal from the printer 100 in T952. However, the AP 6 may receive response signals also from other child stations, not only from the printer 100.

In this case, in T952, the AP 6 sends the response signals received from the respective child stations to the terminal 10.

The terminal 10 receives the respective response signals from the AP 6 via the Wi-Fi I/F 16 in T952. In this case, the terminal 10 determines whether or not the response signal including the MAC address "abc" of the printer 100 obtained in T822 is included in those received response signals. In the present case, since the response signal including the MAC address "abc" is included, the terminal 10 determines that the printer 100 has participated in the wireless network formed by the AP 6 as a child station. Further, in T954, the terminal 10 sends a completion notification to the printer 100 via the Wi-Fi I/F 16 with intermediation of the AP 6. The completion notification is a notification indicating that the terminal 10 and the printer 100 have established the Wi-Fi connections with the same AP 6.

When the printer 100 receives the completion notification from the terminal 10 via the Wi-Fi I/F 116 with the intermediation of the AP 6 in T954, it determines that the terminal 10 and the printer 100 have established the Wi-Fi connections with the same AP 6, that is, determines that it is capable of communicating with the terminal 10 with the intermediation of the AP 6, and executes processes from T956. T956 is similar to T324 of FIG. 5. In T958, the printer 100 stops sending the Advertise signal. Due to this, processing load on the printer 100 can be reduced.

Further, when the printer 100 receives the completion notification from the terminal 10 in T954, it deletes the public key PPK1 and the private key psk1 in T960 and creates the public key PPK3 and the private key psk3 in T962.

When the above processes are executed, the terminal 10 and the printer 100 come to establish the Wi-Fi connections with the same AP 6. In this case, the printer 100 can receive print data from the terminal 10 in T970 with the intermediation of the AP 6. As a result, the printer 100 can execute print according to the print data in T972.

According to the present embodiment, the printer 100 creates the public key PPK3 and the private key psk3 and stores them in the memory 134 (T962) in the case of determining that the Wi-Fi connection is established between the AP 6 and the printer 100 and communication with the terminal 10 is enabled (T952). According to such a configuration, an Advertise signal including the public key PPK3 can promptly be sent in a case where the connection execution button in the setting screen is selected again by the user. Thus, the user convenience can be improved.

On the other hand, in a case of not receiving the completion notification from the terminal 10 even when a predetermined time has elapsed since the response signal was sent in T950, the printer 100 determines that the communication with the terminal 10 with the intermediation of the AP 6 is not enabled. For example, in a case where the Wi-Fi connection between the terminal 10 and the AP 6 is disconnected, the response signal is not received by the terminal 10, thus the printer 100 cannot receive the completion notification. In this case, the printer 100 does not delete the public key PPK1 or the private key psk1. Due to this, sending of the Advertise signal including the public key PPK1 can be continued until the terminal 10 and the printer 100 establish the Wi-Fi connections with the same AP 6.

(Corresponding Relationships)

The public key PPK1 and the public key PPK3 are respectively examples of "first information" and "second information". The BT I/F 120 is an example of "second wireless interface". Receipt of the response signal in T952 of FIG. 11 is an example of "predetermined condition is satisfied".

(Variant 1) In the first embodiment as above, the printer 100 displays the QR code obtained by using the public key PPK1 (T122 of FIG. 3, T522 of FIG. 7). Instead of this, the printer 100 may display a barcode obtained by using the public key PPK1 (or PPK3). In this variant, the barcode is an example of "first information (and first code image)" and "second information (and second code image)".

(Variant 2) In the first embodiment as above, the printer 100 creates the public key PPK3 in the case of receiving the CRes from the terminal 10 (T322 of FIG. 5). Instead of this, the printer 100 may create the public key PPK3 in a case of sending the ARes to the terminal 10 in T210 of FIG. 4. In general terms, a predetermined condition may be satisfied in a case where an authentication response is sent to a terminal device. Further, instead of the above configuration, the printer 100 may create the public key PPK3 after T226 of FIG. 4 has been executed, or may create the public key PPK3 in a case where display of the QR code is stopped by a predetermined operation performed by the user on the operation unit 112. In general terms, the predetermined condition may be satisfied in a case where an output unit stops outputting the first information.

(Variant 3) The process of T226 of FIG. 4 may not be executed. In general terms, the output unit may not stop outputting the first information. Further, in this variant, "cause a display unit of the communication device to display an execution screen" may be omitted.

(Variant 4) In the first embodiment as above, the printer 100 executes the process of T226 prior to T322. Instead of this, the printer 100 may execute the process of T226 after T322. In general terms, the predetermined condition may be satisfied before the output unit stops outputting the first information.

(Variant 5) In the first embodiment as above, the printer 100 creates the QR code in the case where the QR code button in the setting screen is selected by the user (T121 of FIG. 3). Instead of this, the printer 100 may create the QR code prior to the selection of the QR code button. In this variant, "create the first code image in the case where the predetermined instruction is inputted to the communication device" and "create the second code image in the case where the predetermined instruction is inputted to the communication device again" may be omitted.

(Variant 6) In the second embodiment as above, the printer 100 executes print of the QR image including the valid duration. Instead of this, the printer 100 may execute print of a QR image including date and time when the valid duration ends. In this variant, the date and time when the valid duration ends is an example of "information indicating the predetermined time".

(Variant 7) In the second embodiment as above, the printer 100 executes print of the QR image including the QR code for app download. Instead of this, the printer 100 may execute print of a QR image including the URL of the server, an app name of the connection application 40, and the like. In this variant, the URL and the app name are examples of "information that is related to an application program".

(Variant 8) The QR image may not include the valid duration. In this variant, print of the information indicating the predetermined time may be omitted. Further, the QR image may not include the QR code for app download. In this variant, print of the information related to the application program may be omitted.

(Variant 9) The process of Case C2 of FIG. 10 may not be executed. In general terms, the second public key may be created in a case where the predetermined condition is satisfied due to the predetermined time elapsing after the authentication request has been received from the terminal device and before the connection information is received from the terminal device.

(Variant 10) In the third embodiment as above, the printer 100 determines that the printer 100 and the terminal 10 are capable of communicating with each other with the intermediation of the AP 6 in the case of receiving the completion notification from the terminal 10 (T954 of FIG. 11). Instead of this, the printer 100 may determine that the printer 100 and the terminal 10 are capable of communicating with each other with the intermediation of the AP 6 in a case of receiving the response signal for the confirmation signal from the terminal 10 in response to sending the confirmation signal to the terminal 10 via the Wi-Fi I/F 116 with the intermediation of the AP 6. In this variant, receipt of the response signal from the terminal 10 is an example of "in a case where the communication device is capable of communicating with the terminal device via the external device".

(Variant 11) "Second wireless interface" is not limited to the BT I/F 120, and may be, for example, an NFC I/F for executing wireless communication according to another communication scheme such as Near Field Communication (NFC), infrared communication, and transferjet (registered trademark). Further, "second wireless interface" may be same as "first wireless interface". Specifically, the printer 100 may use an in-band function of the Wi-Fi I/F 116 to send the public key PPK1 to the terminal 10 via the Wi-Fi I/F 116 (see T822 of FIG. 11).

(Variant 12) In the third embodiment as above, the printer 100 creates the public key PPK3 (T962) in the case of determining that the printer 100 and the terminal 10 are capable of communicating with each other with the intermediation of the AP 6 (T954 of FIG. 11). Instead of this, the printer 100 may not execute the processes of T950 to T954 and may create the public key PPK3 in a case where the Wi-Fi connection is established between the printer 100 and the AP 6 (T930). In general terms, "predetermined condition is satisfied" may not include that the communication device and the terminal device are capable of communicating with each other with intermediation of the external device.

(Variant 13) The process of T932 of FIG. 11 may not be executed. In this variant, "stop sending the first information" may be omitted.

(Variant 14) "Predetermined instruction" is not limited to the predetermined operation being performed by the user on the operation unit 112 (for example, the selection of the QR code button in the setting screen (T120 of FIG. 3)), and may be, for example, receipt of a specific signal from the terminal 10. The specific signal may be, for example, a Probe request signal according to the Wi-Fi scheme, an Advertise signal according to the BT scheme, and a Polling signal according to the NFC scheme.

(Variant 15) An NA process may be executed between the terminal 10 and the printer 100 in T20 of FIG. 2 and the Wi-Fi connection may thereby be established between the terminal 10 and the printer 100. That is, "external device" may be same as "terminal device".

(Variant 16) The process of T124 of FIG. 3 may not be executed. In this variant, "transit an operation state of the communication device from a non-responsive state to a responsive state" may be omitted. Further, the process of T324 of FIG. 5 may not be executed. In this variant, "transit the operation state of the communication device from the responsive state to the non-responsive state" may be omitted.

(Variant 17) The process of T102 of FIG. 3 may not be executed. For example, the public key PPK1 may be stored in the memory 134 in advance at the time of shipping of the printer 100. In general terms, the first public key may not be created when the power of the communication device is turned on.

(Variant 18) "Communication device" may not be a printer, and may be another device such as a scanner, a multi-function device, a portable terminal, a PC, and a server.

(Variant 19) In each of the above embodiments, the respective processes of FIG. 2 to 11 are implemented by software (that is, the program 136). Instead of this, one or more of the processes may be implemented by hardware such as a logic circuit.

What is claimed is:

1. A communication device comprising:
    a first wireless interface;
    a processor;
    a memory storing computer-readable instructions therein and configured to store a first public key; and
    an output unit configured to output first information obtained by using the first public key in the memory in a case where a predetermined instruction is inputted to the communication device after the first public key has been stored in the memory,
    wherein the computer-readable instructions, when executed by the processor, cause the communication device to:
    after the first information has been outputted, receive, via the first wireless interface, an authentication request in which the first public key is used from a terminal device that obtained the first public key;
    in a case where the authentication request is received from the terminal device, send an authentication response, as a response for the authentication request, to the terminal device via the first wireless interface;
    after the authentication response has been sent to the terminal device, receive connection information from the terminal device via the first wireless interface, the connection information being for establishing a wireless connection via the first wireless interface between the communication device and an external device;
    in a case where the connection information is received from the terminal device, establish the wireless connection via the first wireless interface between the communication device and the external device by using the connection information; and
    in a case where a predetermined condition is satisfied after the first information has been outputted, create a second public key different from the first public key and store the second public key in the memory,
    wherein in a case where the predetermined instruction is inputted again to the communication device after the second public key has been stored in the memory, the output unit is further configured to output second information obtained by using the second public key in the memory.

2. The communication device as in claim 1, wherein the predetermined condition is satisfied in a case where the connection information is received from the terminal device.

3. The communication device as in claim 1, wherein
the output unit stops outputting the first information in a case where the authentication response is sent to the terminal device.

4. The communication device as in claim 1, wherein
the predetermined condition is satisfied after the output unit has stopped outputting the first information.

5. The communication device as in claim 1, wherein
the output unit is a display unit,
the first information is a first code image obtained by coding the first public key,
the second information is a second code image obtained by coding the second public key, and
the computer-readable instructions, when executed by the processor, further cause the communication device to:
cause the output unit which is the display unit to display the first information which is the first code image in the case where the predetermined instruction is inputted to the communication device; and
cause the output unit which is the display unit to display the second information which is the second code image in the case where the predetermined instruction is inputted to the communication device again.

6. The communication device as in claim 5, wherein
the computer-readable instructions, when executed by the processor, further cause the communication device to:
create the first code image by using the first public key in the memory in the case where the predetermined instruction is inputted to the communication device; and
create the second code image by using the second public key in the memory in the case where the predetermined instruction is inputted to the communication device again.

7. The communication device as in claim 1, wherein
the second public key is created in a case where the predetermined condition is satisfied after the first information has been outputted without the predetermined instruction being inputted to the communication device again.

8. The communication device as in claim 1, wherein
the predetermined instruction includes at least one of:
accepting a predetermined operation to an operating unit of the communication device from a user; and
receiving a specific signal from the terminal device.

9. The communication device as in claim 1, wherein
the computer-readable instructions, when executed by the processor, further cause the communication device to:
after the authentication response has been sent to the terminal device, cause a display unit of the communication device to display an execution screen indicating that a process for establishing the wireless connection is being executed.

10. The communication device as in claim 1, wherein
the second public key is created by using information related to a communication traffic volume of the communication device.

11. The communication device as in claim 1, wherein
the computer-readable instructions, when executed by the processor, further cause the communication device to:
transit an operation state of the communication device from a non-responsive state to a responsive state in the case where the predetermined instruction is inputted to the communication device, the non-responsive state being a state in which the authentication response is not sent even if the authentication request is received from the terminal device, and the responsive state being a state in which the authentication response is sent in the case where the authentication request is received from the terminal device,
wherein the authentication response is sent to the terminal device via the first wireless interface in a case where the authentication request is received from the terminal device after the operation state of the communication device has been transited from the non-responsive state to the responsive state.

12. The communication device as in claim 11, wherein
the computer-readable instructions, when executed by the processor, further cause the communication device to:
transit the operation state of the communication device from the responsive state to the non-responsive state in a case where the second public key is created in a situation where the operation state of the communication device is the responsive state.

13. The communication device as in claim 1, wherein
the computer-readable instructions, when executed by the processor, further cause the communication device to:
when power of the communication device is turned on, create the first public key and store the first public key in the memory.

14. The communication device as in claim 1, wherein
the output unit is a print executing unit,
the first information is a first code image obtained by coding the first public key,
the second information is a second code image obtained by coding the second public key, and
the computer-readable instructions, when executed by the processor, further cause the communication device to:
cause the output unit which is the print executing unit to execute print of the first information which is the first code image in the case where the predetermined instruction is inputted to the communication device; and
cause the output unit which is the print executing unit to execute print of the second information which is the second code image in the case where the predetermined instruction is inputted to the communication device again,
wherein the predetermined condition is satisfied in a case where a predetermined time elapses since the print of the first information which is the first code image was executed.

15. The communication device as in claim 14, wherein
the computer-readable instructions, when executed by the processor, further cause the communication device to:
cause the output unit which is the print executing unit to execute print of information indicating the predetermined time.

16. The communication device as in claim 14, wherein
the computer-readable instructions, when executed by the processor, further cause the communication device to:
cause the output unit which is the print executing unit to execute print of information that is related to an application program for establishing the wireless connection by using the first public key.

17. The communication device as in claim 14, wherein
the second public key is created in a case where the predetermined condition is satisfied due to the predetermined time elapsing before the authentication request is received from the terminal device,
the second public key is created in a case where the predetermined condition is satisfied due to the predetermined time elapsing after the connection information has been received from the terminal device, and even if the predetermined condition is satisfied due to the predetermined time elapsing after the authentication request has been received from the terminal device and before the connection information is received from the terminal device, the second public key is not created, and after the connection information has been received from the terminal device, the second public key is created.

18. The communication device as in claim 1, wherein the predetermined condition is satisfied in a case where the wireless connection is established between the communication device and the external device.

19. The communication device as in claim 18, wherein the predetermined condition is satisfied in a case where the wireless connection is established between the communication device and the external device, and the communication device is capable of communicating with the terminal device via the external device.

20. The communication device as in claim 18, wherein the output unit is a second wireless interface, and the output unit which is the second wireless interface is configured to:
   send the first information externally in the case where the predetermined instruction is inputted to the communication device; and
   send the second information externally in the case where the predetermined instruction is inputted to the communication device again,
   wherein the computer-readable instructions, when executed by the processor, further cause the communication device to:
   stop sending the first information via the second wireless interface in the case where the wireless connection is established between the communication device and the external device.

21. A non-transitory computer-readable medium storing computer-readable instructions for a communication device, wherein the communication device comprises:
   a first wireless interface;
   a memory configured to store a first public key; and
   an output unit configured to output first information obtained by using the first public key in the memory in a case where a predetermined instruction is inputted to the communication device after the first public key has been stored in the memory,
   wherein the computer-readable instructions, when executed by a processor of the communication device, cause the communication device to:
   after the first information has been outputted, receive, via the first wireless interface, an authentication request in which the first public key is used from a terminal device that obtained the first public key;
   in a case where the authentication request is received from the terminal device, send an authentication response as a response for the authentication request to the terminal device via the first wireless interface;
   after the authentication response has been sent to the terminal device, receive connection information from the terminal device via the first wireless interface, the connection information being for establishing a wireless connection via the first wireless interface between the communication device and an external device;
   in a case where the connection information is received from the terminal device, establish the wireless connection via the first wireless interface between the communication device and the external device by using the connection information; and
   in a case where a predetermined condition is satisfied after the first information has been outputted, create a second public key deferent from the first public key and store the second public key in the memory,
   wherein in a case where the predetermined instruction is inputted again to the communication device after the second public key has been stored in the memory, the output unit is further configured to output second information obtained by using the second public key in the memory.

22. A method executed by a communication device, wherein the communication device comprises:
   a first wireless interface;
   a memory configured to store a first public key; and
   an output unit configured to output first information obtained by using the first public key in the memory in a case where a predetermined instruction is inputted to the communication device after the first public key has been stored in the memory,
   wherein the method comprises:
   after the first information has been outputted, receiving, via the first wireless interface, an authentication request in which the first public key is used from a terminal device that obtained the first public key;
   in a case where the authentication request is received from the terminal device, sending an authentication response as a response for the authentication request to the terminal device via the first wireless interface;
   after the authentication response has been sent to the terminal device, receiving connection information from the terminal device via the first wireless interface, the connection information being for establishing a wireless connection via the first wireless interface between the communication device and an external device;
   in a case where the connection information is received from the terminal device, establishing the wireless connection via the first wireless interface between the communication device and the external device by using the connection information; and
   in a case where a predetermined condition is satisfied after the first information has been outputted, creating a second public key deferent from the first public key and store the second public key in the memory,
   wherein in a case where the predetermined instruction is inputted again to the communication device after the second public key has been stored in the memory, the output unit is further configured to output second information obtained by using the second public key in the memory.

* * * * *